US011968540B2

(12) United States Patent
Nguyen et al.

(10) Patent No.: US 11,968,540 B2
(45) Date of Patent: Apr. 23, 2024

(54) INDEPENDENTLY MANAGING WIRELESS TRANSMISSION BY INDIVIDUAL SPECTRUM ACCESS SYSTEMS IN A SHARED RADIO FREQUENCY SPECTRUM

(71) Applicant: Government of the United States of America, as represented by the Secretary of Commerce, Gaithersburg, MD (US)

(72) Inventors: Thao Tran-Nhu Nguyen, McLean, VA (US); Michael Rafat Souryal, Arlington, VA (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 280 days.

(21) Appl. No.: 17/340,819

(22) Filed: Jun. 7, 2021

(65) Prior Publication Data

US 2021/0385664 A1   Dec. 9, 2021

Related U.S. Application Data

(60) Provisional application No. 63/035,931, filed on Jun. 8, 2020.

(51) Int. Cl.
*H04W 16/14* (2009.01)
*H04W 72/0453* (2023.01)
*H04W 72/541* (2023.01)

(52) U.S. Cl.
CPC ....... *H04W 16/14* (2013.01); *H04W 72/0453* (2013.01); *H04W 72/541* (2023.01)

(58) Field of Classification Search
CPC ............. H04W 16/14; H04W 72/0453; H04W 72/541; H04J 11/005
See application file for complete search history.

(56) References Cited

U.S. PATENT DOCUMENTS

2018/0302920 A1\* 10/2018 Hall .................... H04W 74/006
2019/0357155 A1\* 11/2019 Al-Mufti ............. H04W 52/243
2021/0195429 A1\*  6/2021 Macmullan ........... H04W 24/02

OTHER PUBLICATIONS

"Requirements for commercial operation in the U.S. 3550-3700 MHz citizens broadband radio serviceband," Wireless Innovation Forum Document WINNF-TS-0112, Version V1.9.1, Mar. 2020. [Online].Available: https://cbrs.wirelessinnovation.org/release-1-standards-specifications.

\* cited by examiner

*Primary Examiner* — Ayaz R Sheikh
*Assistant Examiner* — David Zhijun Sun
(74) *Attorney, Agent, or Firm* — Office of Chief Counsel for National Institute of Standards and Technology

(57) ABSTRACT

Systems and methods for independently managing wireless transmission by individual spectrum access systems in a radio frequency spectrum shared by a plurality of spectrum access systems. An example method includes: receiving, by the spectrum access system, an interference budget from a sensor; determining, by the spectrum access system, secondary users managed by the spectrum access system in a radio frequency spectrum shared by a plurality of spectrum access systems; managing a move list for the spectrum access system independently of the other spectrum access systems in an absence of exchange of spectrum grant information with the other spectrum access systems; and determining the move list for the spectrum access system from a first moment and a second moment of an aggregate interference distribution such that the spectrum access system provides grants to its secondary users in a dynamic protection area of the spectrum access system.

17 Claims, 21 Drawing Sheets

(20 of 21 Drawing Sheet(s) Filed in Color)

| Number of SASs | Move Lst Size | Increase in Move Lst Size (%) | Max 95% Prctl of Agg Interf (dBm/10 MHz) | Decrease in Agg Interf Prctl (dB) |
|---|---|---|---|---|
| 1 | 24 527 | - | -147.30 | - |
| 2 | 24 867 | 0.58 | -147.45 | 0.14 |
| 3 | 25 250 | 1.22 | -147.82 | 0.51 |
| 4 | 25 543 | 1.72 | -147.90 | 0.60 |
| 5 | 25 891 | 2.31 | -148.04 | 0.74 |
| 10 | 27 080 | 4.32 | -148.56 | 1.25 |

FIG. 3

Algorithm 1: Standard move list algorithm

Input: Set of protection points $\mathcal{P}$, protection frequency range $ch$, set of grants $\mathcal{G}$, protection threshold $t$, receiver azimuth range $\mathcal{A}$

Output: DPA move list on $ch$, $\mathcal{M}_{DPA,ch} \subseteq \mathcal{G}$

1 for $p \in \mathcal{P}$ do
2      $\mathcal{G}_{p,ch} \leftarrow$ `Neighborhood`$(\mathcal{G}, p, ch)$; // $\mathcal{G}_{p,ch} \subseteq \mathcal{G}$
3      $S_{N_c} \leftarrow$ `Sort`$(\mathcal{G}_{p,ch})$;
         // $S_{N_c} = [Grant_1, Grant_2, \cdots, Grant_{N_c}]$
4      for $a \in \mathcal{A}$ do
5          $n_c \leftarrow$ largest $n$ s.t. `Calc95thPrcntl`$(S_n, a) \leq t$
6      end
7      $\mathcal{M}_{p,ch} = \{Grant_{n_c+1}, Grant_{n_c+2}, \cdots, Grant_{N_c}\}$
8 end
9 $\mathcal{M}_{DPA,ch} = \bigcup_p \mathcal{M}_{p,ch}$

FIG. 10

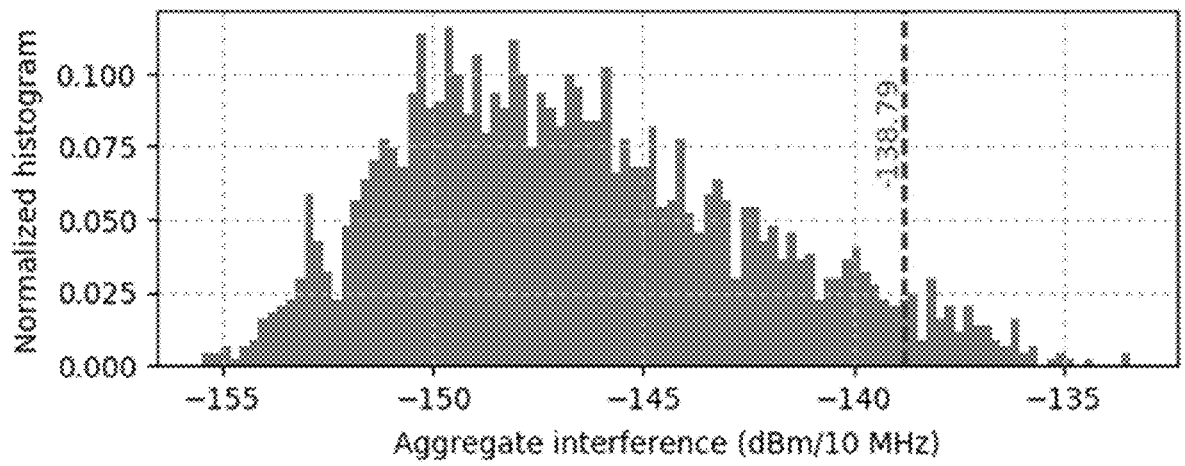
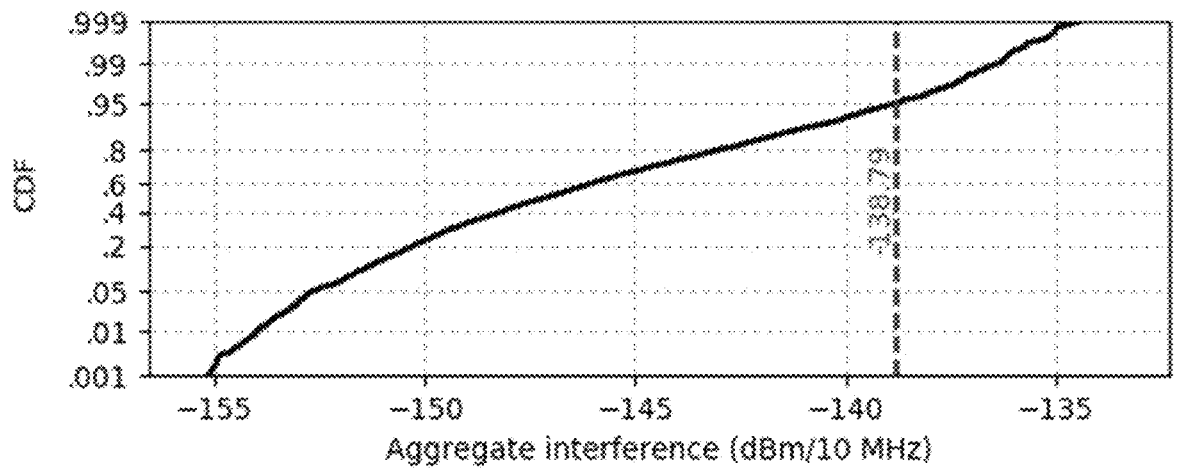
FIG. 11

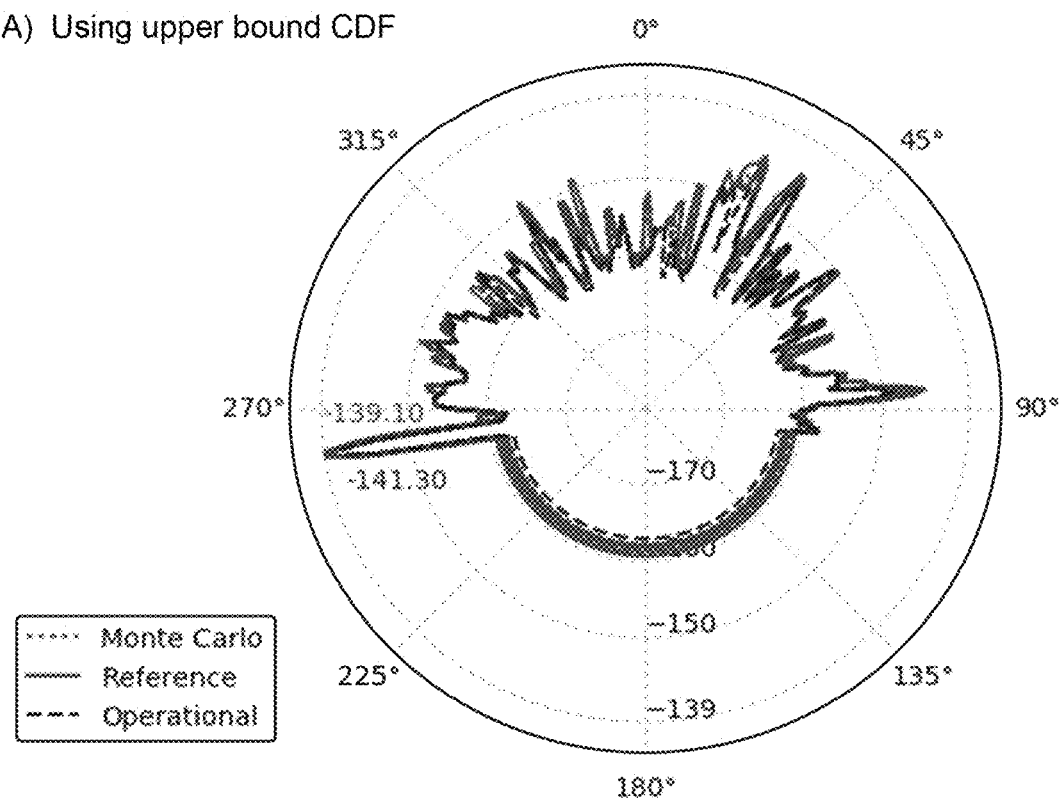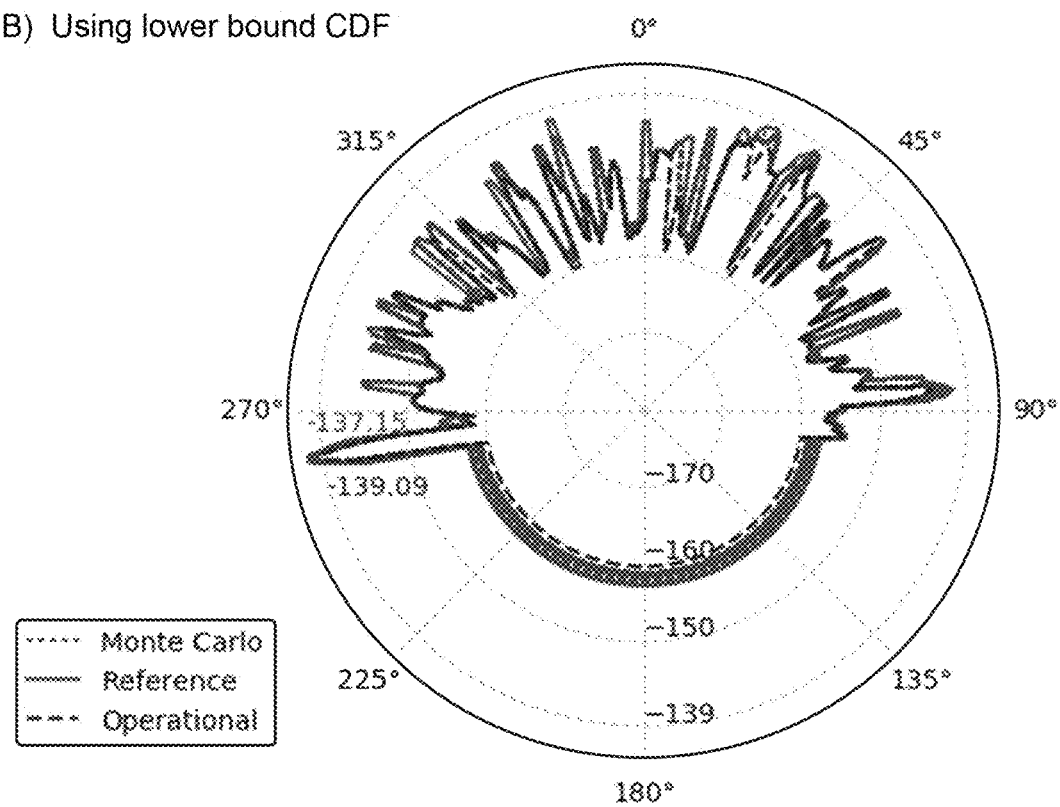
FIG. 18

(A) Move list and keep list sizes
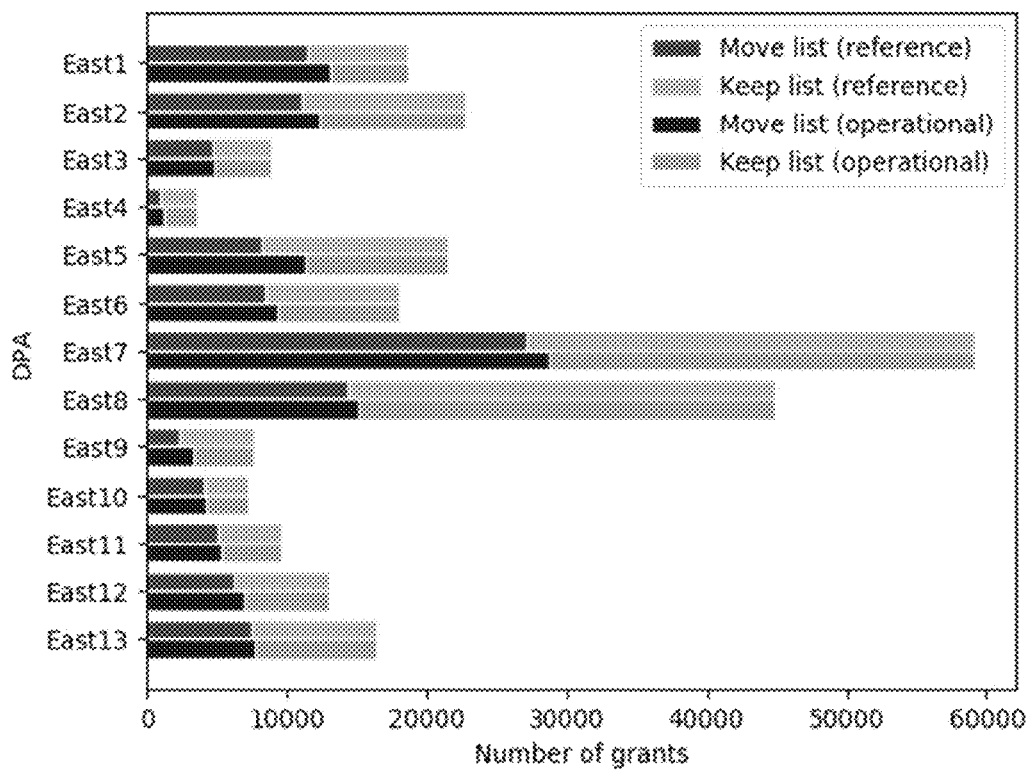
(B) Maximum aggregate interference 95-th percentile
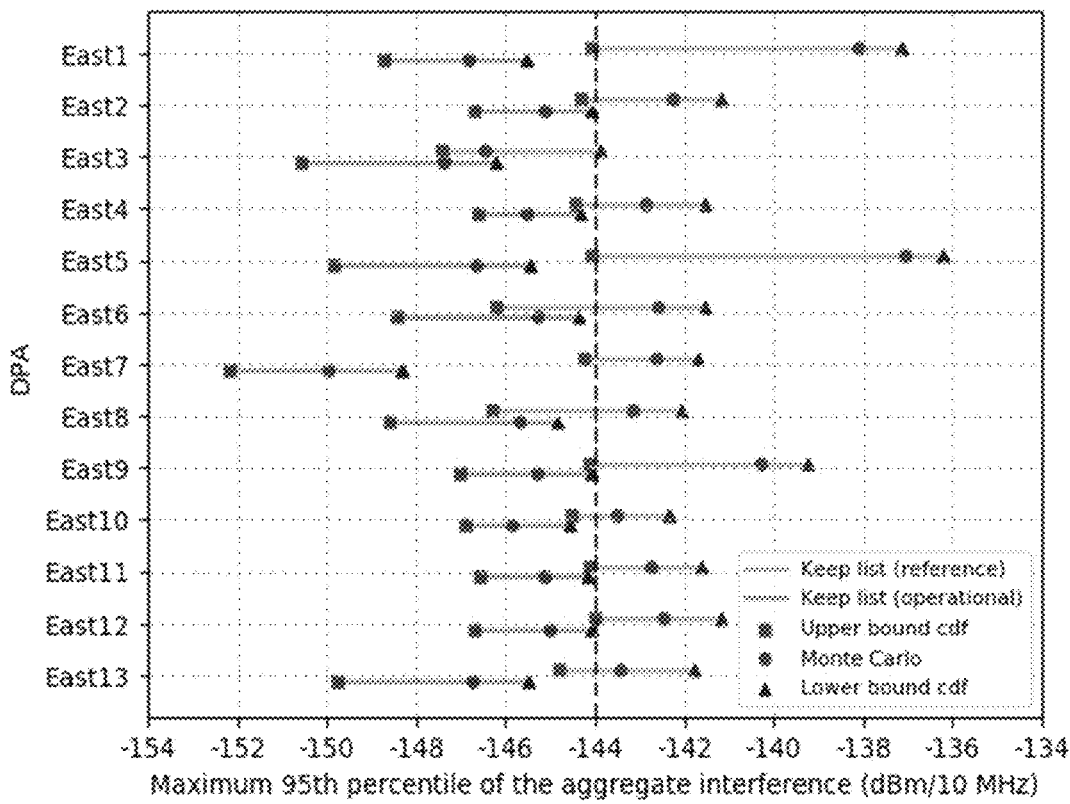
FIG. 19

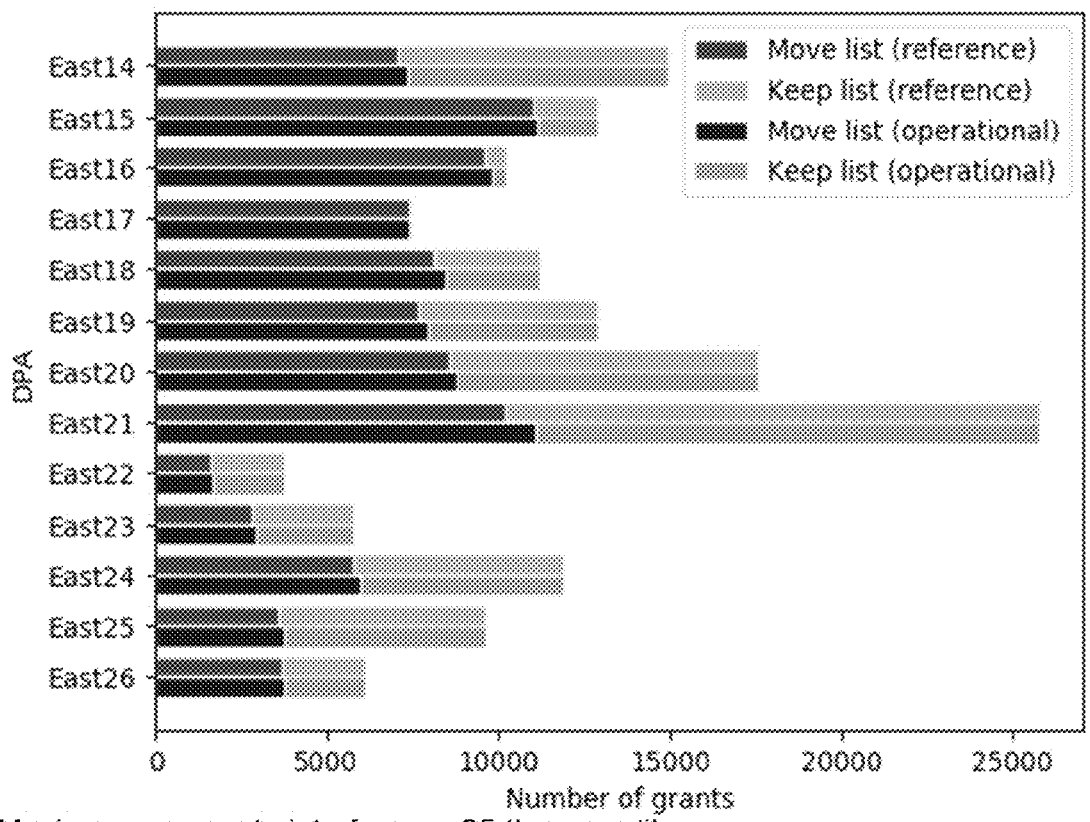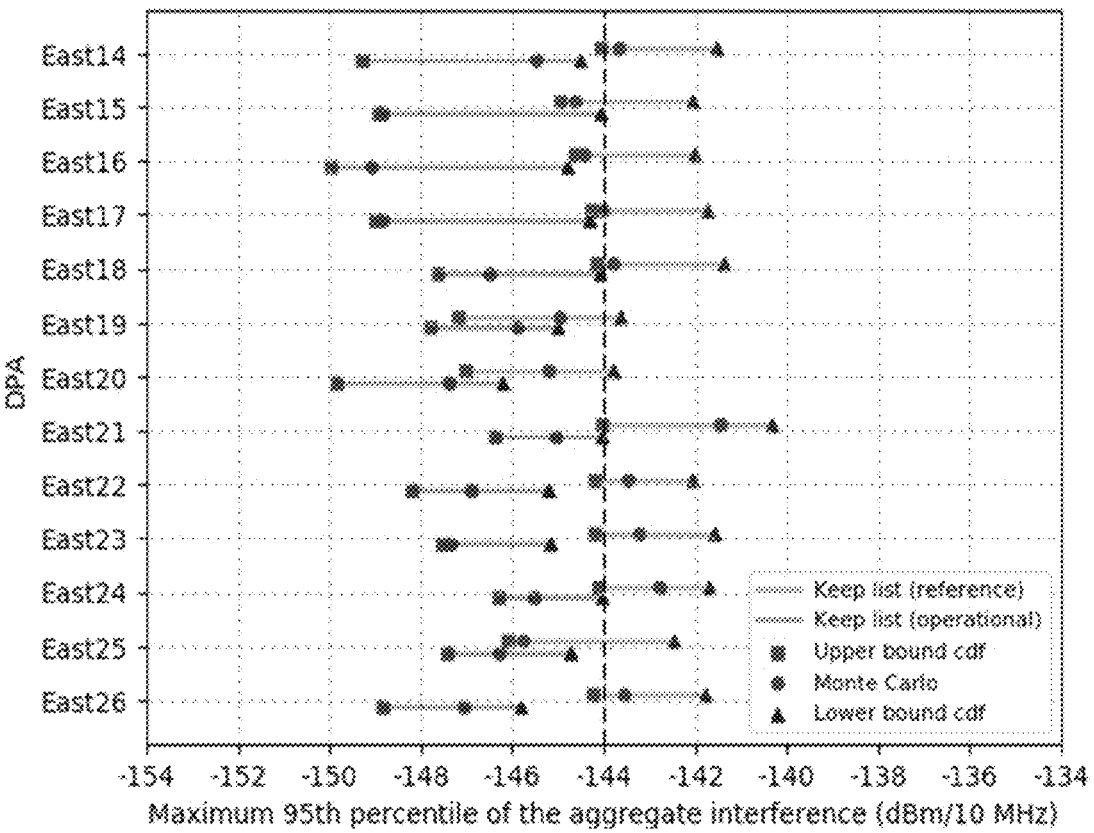
FIG. 20

(A) Move list and keep list sizes
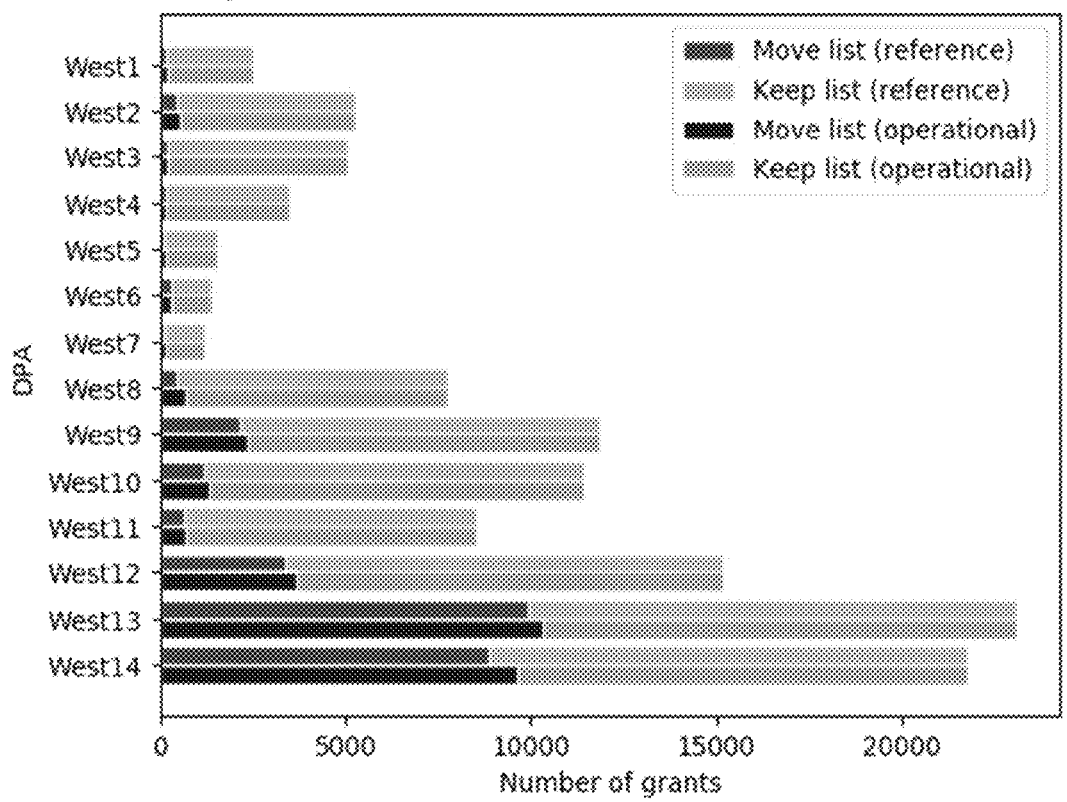
(B) Maximum aggregate interference 95-th percentile
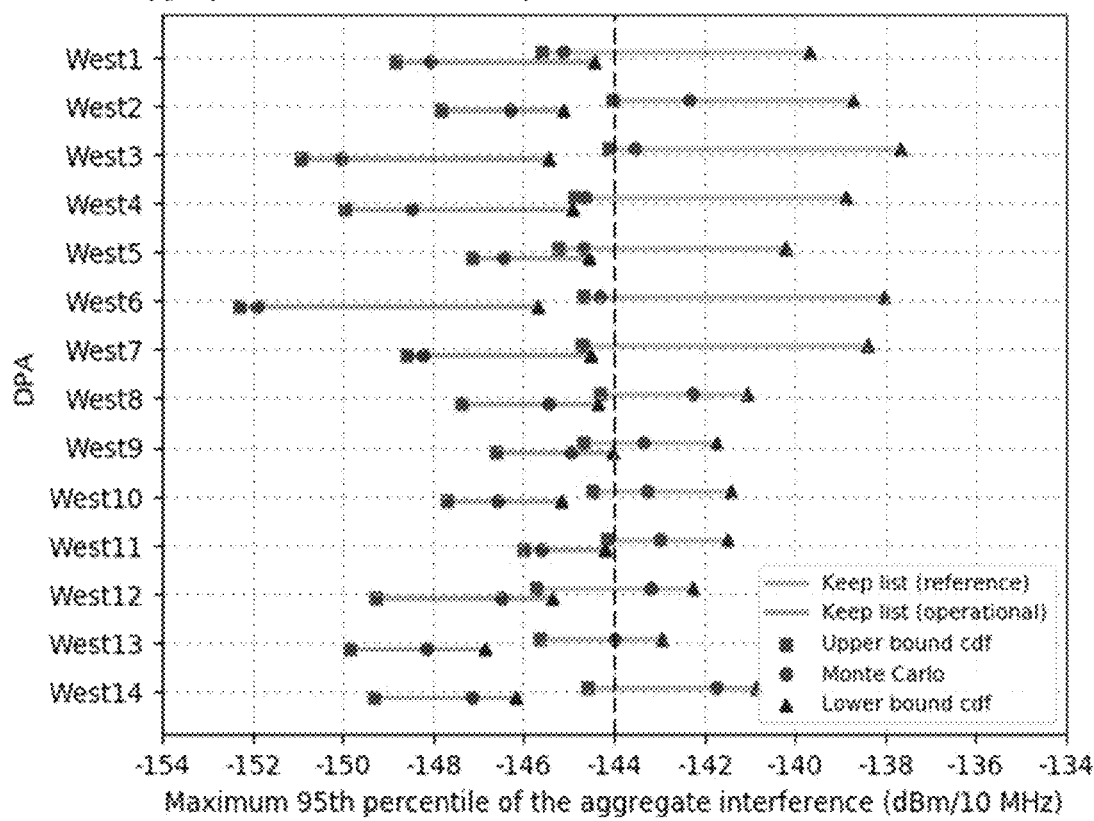
FIG. 21

INDEPENDENTLY MANAGING WIRELESS TRANSMISSION BY INDIVIDUAL SPECTRUM ACCESS SYSTEMS IN A SHARED RADIO FREQUENCY SPECTRUM

CROSS REFERENCE TO RELATED APPLICATIONS

The application claims priority to U.S. Provisional Patent Application Ser. No. 63/035,931 filed Jun. 8, 2020, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice 301-975-2573; email tpo@nist.gov; reference NIST Docket Number 20-045US1.

BRIEF DESCRIPTION

Disclosed is a method implemented by a system of one or more processors, the system being included in a spectrum access system and for independently managing wireless transmission by individual spectrum access systems in a radio frequency spectrum shared by a plurality of spectrum access systems, the method comprising: receiving, by the spectrum access system, an interference budget tj from a sensor; determining, by the spectrum access system, secondary users managed by the spectrum access system in a radio frequency spectrum shared by a plurality of spectrum access systems comprising the spectrum access system and other spectrum access systems; managing, by the spectrum access system, a move list for the spectrum access system independently of the other spectrum access systems in an absence of exchange of spectrum grant information with the other spectrum access systems; and determining, by the spectrum access system, the move list for the spectrum access system from a first moment and a second moment of an aggregate interference distribution such that the spectrum access system provides grants to its secondary users in a dynamic protection area of the spectrum access system according to $$\sigma_j \sqrt{\frac{3p}{8(1-p)}} + \mu_j \le t_j,$$

wherein $\mu_j$ is a mean received power of secondary users managed by the spectrum access system in the dynamic protection area, $\sigma_j^2$ is a variance of the received power, and p is a protection percentile for an incumbent in the dynamic protection area.

Disclosed is a system, for independently managing wireless transmission by an individual spectrum access system in a radio frequency spectrum shared by a plurality of spectrum access systems, comprising: a processor; a receiver, coupled to the processor, that receives an interference budget tj from a sensor; a management module, stored in memory and coupled to the processor, that: receives the interference budget tj from the receiver; manages a move list for the spectrum access system independently of the other spectrum access systems in an absence of exchange of spectrum grant information with the other spectrum access systems; and determines the move list for the spectrum access system from a first moment and a second moment of an aggregate interference distribution such that the spectrum access system provides grants to its secondary users in a dynamic protection area of the spectrum access system according to $$\sigma_j \sqrt{\frac{3p}{8(1-p)}} + \mu_j \le t_j,$$

wherein $\mu_j$ is a mean received power of secondary users managed by the spectrum access system in the dynamic protection area, $\sigma_j^2$ is a variance of the received power, and p is a protection percentile for an incumbent in the dynamic protection area; and a determination engine, stored in memory and coupled to the processor, that: determines secondary users managed by the spectrum access system in a radio frequency spectrum shared by a plurality of spectrum access systems comprising the spectrum access system and other spectrum access systems; and suspends secondary users on the move list for the spectrum access system from emitting radiofrequency signals in the radio frequency spectrum shared by the plurality of spectrum access systems.

Disclosed is a non-transitory computer storage media storing instructions for execution by a system of one or more processors, the system being included in a spectrum access system, and the instructions causing the one or more processors to perform operations comprising: receiving, by the spectrum access system, an interference budget tj from a sensor; determining, by the spectrum access system, secondary users managed by the spectrum access system in a radio frequency spectrum shared by a plurality of spectrum access systems comprising the spectrum access system and other spectrum access systems; managing, by the spectrum access system, a move list for the spectrum access system independently of the other spectrum access systems in an absence of exchange of spectrum grant information with the other spectrum access systems; and determining, by the spectrum access system, the move list for the spectrum access system from a first moment and a second moment of an aggregate interference distribution such that the spectrum access system provides grants to its secondary users in a dynamic protection area of the spectrum access system according to $$\sigma_j \sqrt{\frac{3p}{8(1-p)}} + \mu_j \le t_j,$$

wherein $\mu_j$ is a mean received power of secondary users managed by the spectrum access system in the dynamic protection area, $\sigma_j^2$ is a variance of the received power, and p is a protection percentile for an incumbent in the dynamic protection area.

BRIEF DESCRIPTION OF THE DRAWINGS

The patent or application file contains at least one drawing executed in color. Copies of this patent or patent application publication with color drawings will be provided by the Office upon request and payment of the necessary fee.

The following description cannot be considered limiting in any way. With reference to the accompanying drawings, like elements are numbered alike.

FIG. 3 shows move list size and aggregate interference results as a function of the number of SASs for DPA East7;

FIG. 10 shows pseudocode for the conventional move list algorithm;

FIG. 11 shows interference histograms from grants to a single protection point in Pensacola DPA for (a) Interference contribution and (b) aggregate interference;

FIG. 18 shows $95^{th}$-percentile of the aggregate interference (dBm/10 MHz) of the keep list by receiver azimuth, Pensacola DPA;

FIG. 19 shows coastal DPAs East1-East13 results for (a) reference and operational move list and keep list sizes and for (b) maximum 95th percentile of the aggregate interference (dBm/10 MHz), over all protection points and all receiver azimuths, of the reference and operational keep lists;

FIG. 20 shows coastal DPAs East14-East26 results for (a) reference and operational move list and keep list sizes and for (b) maximum 95th percentile of the aggregate interference (dBm/10 MHz), over all protection points and all receiver azimuths, of the reference and operational keep lists; and FIG. 21 shows coastal DPAs West1-West14 results for (a) reference and operational move list and keep list sizes and for (b) maximum 95th percentile of the aggregate interference (dBm/10 MHz), over all protection points and all receiver azimuths, of the reference and operational keep lists.

DETAILED DESCRIPTION

Figure 1:
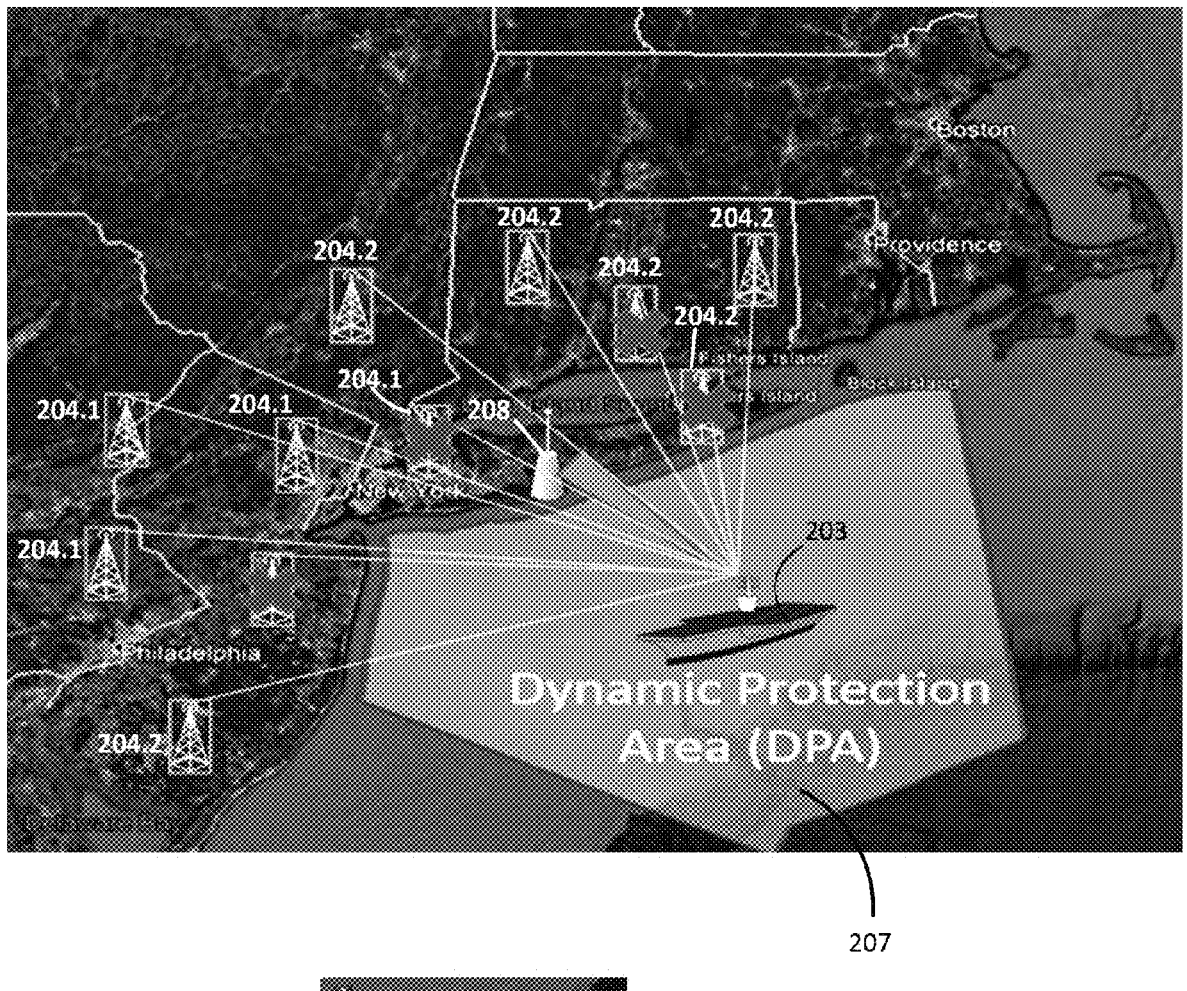
FIG. 1 shows systems deployed within the neighborhood of an offshore dynamic protection area (DPA) near New York.

A detailed description of one or more embodiments is presented herein by way of exemplification and not limitation.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UE). A base station may communicate with UEs on downlink channels (e.g., for transmissions from a base station to a UE) and uplink channels (e.g., for transmissions from a UE to a base station).

Some modes of communication may enable communication between a base station and a UE over a shared radio frequency spectrum band (e.g., a radio frequency spectrum band shared with Wi-Fi nodes), or over different radio frequency spectrum bands (e.g., a dedicated radio frequency spectrum band and a shared radio frequency spectrum band) of a cellular network. With increasing data traffic in cellular networks that use a dedicated (e.g., licensed) radio frequency spectrum band, offloading of at least some data traffic to a shared radio frequency spectrum band may provide a cellular operator with opportunities for enhanced data transmission capacity. A shared radio frequency spectrum band may also provide service in areas where access to a dedicated radio frequency spectrum band is unavailable.

Prior to gaining access to, and communicating over, a shared radio frequency spectrum band, a base station or UE may perform a listen before talk (LBT) procedure to contend for access to the shared radio frequency spectrum band. An LBT procedure may include performing a clear channel assessment (CCA) procedure or extended CCA (ECCA) procedure to determine whether a channel of the shared radio frequency spectrum band is available. When it is determined that the channel of the shared radio frequency spectrum band is available, the base station or UE may transmit one or more channel reservation signals (e.g., one or more channel usage beacon signals (CUBS)) over the channel, to reserve the channel. In some examples, the channel reservation signal(s) may be transmitted over the channel until a next subframe boundary, at which time a data or control transmission may be made over the channel.

With increasing data traffic in cellular networks that use a dedicated radio frequency spectrum band, offloading of at least some data traffic to a shared radio frequency spectrum band may provide a cellular operator (e.g., an operator of a public land mobile network (PLMN) or a coordinated set of base stations defining a cellular network, such as an LTE/LTE-A network) with opportunities for enhanced data transmission capacity. Use of a shared radio frequency spectrum band may also provide service in areas where access to a dedicated radio frequency spectrum band is unavailable. As noted above, before communicating over a shared radio frequency spectrum band, transmitting apparatuses may perform an LBT procedure to gain access to the medium. Such an LBT procedure may include performing a CCA procedure (or ECCA procedure) to determine whether a channel of the shared radio frequency spectrum band is available. When it is determined that the channel of the shared radio frequency spectrum band is available, a CUBS may be transmitted to reserve the channel. When it is determined that a channel is not available, a CCA procedure (or ECCA procedure) may be performed for the channel again at a later time.

Such usage of a shared radiofrequency spectrum can cause congestion and interference with high priority incumbents that can be detrimental to public safety. Managing use of the shared radiofrequency spectrum is necessary. Conventional methods provide each Spectrum Access System (SAS) to exchange detailed information on the emitters it manages with every other SAS on a regular, e.g., daily basis. With a global picture of all emitters, each SAS then uses a conventional algorithm to determine which emissions would have to be suspended to protect a geographic area from excessive aggregate interference.

A method for independently managing wireless transmission has been discovered for more effectively protecting an incumbent in shared radio frequency spectrum from aggregate interference exceeding a specified threshold from emitters managed by multiple Spectrum Access Systems (SASs). Independently managing wireless transmission allows each SAS to calculate its own list of emitters to suspend without detailed knowledge of the other SAS's emitters, with a guarantee that a specified percentile of the aggregate of all SASs' managed emissions will not exceed a threshold. It represents a significant simplification over the conventional method and offers flexibility to each SAS to independently manage its emitters. Independently managing wireless transmission uses a bound on the cumulative distribution function of the stochastic aggregate interference and a partitioning of the overall interference budget among the SASs. Accordingly, independently managing wireless transmission guarantees that a specified percentile of the aggregate of all SASs' managed emissions will not exceed a threshold and does so without requiring each SAS to share potentially sensitive information on its customers with other SASs, without requiring that SASs to use a conventional algorithm, and provides flexibility to each SAS to independently manage its emitters without exceeding individual SAS allotted interference budget.

In an embodiment, with reference to FIG. 1, a method implemented by a system of one or more processors, the system being included in a spectrum access system 202 and for independently managing wireless transmission by individual spectrum access systems in a radio frequency spectrum shared by a plurality of spectrum access systems, includes: determining, by the spectrum access system 202, an interference budget tj given the number of secondary users managed by the spectrum access system 202 and by other spectrum access systems; determining, by the spectrum access system 202, secondary users 204 managed by the spectrum access system 202 in a radio frequency spectrum shared by a plurality of spectrum access systems 202 including the spectrum access system 202 and other spectrum access systems; managing, by the spectrum access system 202, a move list for the spectrum access system 202 independently of the other spectrum access systems in an absence of exchange of spectrum grant information with the other spectrum access systems; and determining, by the spectrum access system 202, the move list for the spectrum access system 202 from a first moment and a second moment of an aggregate interference distribution such that the spectrum access system 202 provides grants to its secondary users 204 in the neighborhood of a dynamic protection area 207 of the spectrum access system 202 according to $$\sigma_j \sqrt{\frac{3p}{8(1-p)}} + \mu_j \le t_j,$$

wherein $\mu_j$ is a mean received power of secondary users managed by the spectrum access system 202 in the dynamic protection area 207, $\sigma_j^2$ is a variance of the received power, and p is a protection percentile for an incumbent 203 in the dynamic protection area 207.

In an embodiment, the method includes suspending, by the spectrum access system 202, secondary users 204 on the move list for the spectrum access system 202.

According to an embodiment, the method includes protecting the incumbent 203 in the shared radio frequency spectrum of the dynamic protection area 207 from aggregate interference exceeding a protection threshold from secondary users 204 managed by the plurality of spectrum access systems.

In an embodiment, a system, for independently managing wireless transmission by an individual spectrum access system in a radio frequency spectrum shared by a plurality of spectrum access systems, includes: a processor that determines an interference budget tj; a management module, stored in memory and coupled to the processor, that: receives the interference budget tj from the processor; manages a move list for the spectrum access system 202 independently of the other spectrum access systems in an absence of exchange of spectrum grant information with the other spectrum access systems; and determines the move list for the spectrum access system 202 from a first moment and a second moment of an aggregate interference distribution such that the spectrum access system 202 provides grants to its secondary users 204 in the neighborhood of a dynamic protection area 207 of the spectrum access system 202 according to $$\sigma_j \sqrt{\frac{3p}{8(1-p)}} + \mu_j \le t_j,$$

wherein $\mu_j$ is a mean received power of secondary users managed by the spectrum access system 202 in the dynamic protection area 207, $\sigma_j^2$ is a variance of the received power, and p is a protection percentile for an incumbent 203 in the dynamic protection area 207; and a determination engine, stored in memory and coupled to the processor, that: determines secondary users 204 managed by the spectrum access system 202 in a radio frequency spectrum shared by a plurality of spectrum access systems 202 comprising the spectrum access system 202 and other spectrum access systems; and suspends secondary users 204 on the move list for the spectrum access system 202 from emitting radiofrequency signals in the radio frequency spectrum shared by the plurality of spectrum access systems. The system can include protecting the incumbent 203 in the shared radio frequency spectrum of the dynamic protection area 207 from aggregate interference exceeding a protection threshold from secondary users 204 managed by the plurality of spectrum access systems.

In an embodiment, a non-transitory computer storage media storing instructions for execution by a system of one or more processors, the system being included in a spectrum access system 202, and the instructions causing the one or more processors to perform operations comprising: determining, by the spectrum access system 202, an interference budget $t_j$; determining, by the spectrum access system 202, secondary users 204 managed by the spectrum access system 202 in a radio frequency spectrum shared by a plurality of spectrum access systems 202 comprising the spectrum access system 202 and other spectrum access systems; managing, by the spectrum access system 202, a move list for the spectrum access system 202 independently of the other spectrum access systems in an absence of exchange of spectrum grant information with the other spectrum access systems; and determining, by the spectrum access system 202, the move list for the spectrum access system 202 from a first moment and a second moment of an aggregate interference distribution such that the spectrum access system 202 provides grants to its secondary users 204 in the neighborhood of a dynamic protection area 207 of the spectrum access system 202 according to $$\sigma_j \sqrt{\frac{3p}{8(1-p)}} + \mu_j \le t_j,$$

wherein $\mu_j$ is a mean received power of secondary users managed by the spectrum access system 202 in the dynamic protection area 207, $\sigma_j^2$ is a variance of the received power, and p is a protection percentile for an incumbent 203 in the dynamic protection area 207. The computer storage media further can include suspending, by the spectrum access system 202, secondary users 204 on the move list for the spectrum access system 202. The computer storage media further can include protecting the incumbent 203 in the shared radio frequency spectrum of the dynamic protection area 207 from aggregate interference exceeding a protection threshold from secondary users 204 managed by the plurality of spectrum access systems.

It is contemplated that the total protection percentile is greater than or equal to 0.95 although other total percentiles that are less than 0.95 are contemplated. Further, percentile p is equal to 0.95 although other percentiles p that are greater or less than 0.95 are contemplated.

The radio frequency spectrum shared by the plurality of spectrum access systems can include the 3.5 GHz Citizens Broadband Radio Service in the United States although any shared radio frequency spectrum can be managed by independently managing wireless transmission.

The above embodiments of independently managing wireless transmission, systems, and other embodiments are described in more detail by the following Examples, which are non-limiting.

Example Independent Calculation of Move Lists for Incumbent Protection in a Multi-SAS Shared Spectrum Environment In the 3.5 GHz Citizens Broadband Radio Service (CBRS), secondary users are managed by spectrum access systems (SASs) to protect incumbents from interference. Conventional practice requires each SAS to exchange detailed user information with other SASs, and to use a conventional algorithm to suspend transmissions so that an aggregate interference percentile is below a predefined threshold. Independently managing wireless transmission described here includes a tight bound on the aggregate interference distribution. Simulation results show that independently managing wireless transmission trades off a marginal reduction in spectral efficiency to greatly simplify incumbent protection procedure, allowing each SAS to independently manage its users.

In shared spectrum bands with prioritized users, an incumbent is protected from harmful interference from lower priority users. Depending on the type of incumbent, the protection criterion can be defined in terms of mean, median, or a certain percentile of the aggregate interference. The Citizens Broadband Radio Service (CBRS) in the U.S. includes federal incumbents such as military radar systems. A spectrum access system (SAS), which is a centralized spectrum resource allocation service, ensures that the 95th percentile of the aggregate interference from lower tier users stays below a predefined threshold at the receiver of a federal radar system.

Computing the aggregate interference percentile is feasible if the probability distribution has a known closed form. However, in the federal incumbent protection case, the probability distribution has no known closed form and determination of the probability distribution involves estimation of the percentile. The challenge is compounded in scenarios where multiple SASs manage user transmissions in the same geographic area. In such scenarios, the SASs coordinate to ensure that the percentile protection requirement is met. This coordination involves each SAS exchanging information of its user population (e.g., cell locations, transmission powers, antenna configurations) with every other SAS on a regular basis, so that, together, they meet the aggregate interference limits of incumbents from their collective user population. It also requires that all SASs use a conventional algorithm for choosing which of their users to suspend or move to a different channel—known as the "move list" in CBRS standards—when a dynamic incumbent is active on the channel.

To advance development of this band, both SAS administrators and regulators have called for a simplified incumbent protection method to facilitate operation, testing, and certification of individual SASs. There is a need for a solution to this problem, which is provided by embodiments described herein.

This Example describes a method where each SAS in a multi-SAS environment independently manages its user population without detailed knowledge of other SASs' users while guaranteeing that the aggregate interference percentile from all users does not exceed a predefined threshold at the incumbent receiver. Furthermore, the method does not require all SASs to use a conventional algorithm for determining which users to suspend. Advantageously, each SAS is allocated an interference budget and has the flexibility to manage its user population as it sees fit to meet that budget. This Example describes modeling the superposition of signals having non-identical or even unknown distributions. The method leverages a bound on the statistical interference to ensure that the aggregate percentile threshold is met.

Federal Incumbent Protection in CBRS

The National Telecommunications and Information Administration (NTIA), which regulates U.S. federal use of spectrum, defined geographic areas where military radars may operate and require protection from harmful interference. With reference to FIG. 1, the defined geographic areas include dynamic protection area 207 (DPA) that is defined offshore for shipborne radars as well as on land for ground-based radars. DPA 207 may or may not be active (i.e., needing protection) at any given time, depending on whether a radar of incumbent 203 is active in area 207. A designated sensor 208 detects a radar signal from incumbent 203 and informs SASs (e.g., first spectrum access system 202 and second spectrum access system 202) of activated dynamic protection area 207 on certain channels. SASs are collectively required to manage the usage of spectrum resources such that the 95th percentile of the aggregate interference power of all co-channel users within the "neighborhood" (i.e., a DPA-specific distance) of an active DPA is below a DPA-specific threshold power level, e.g., −144 decibels (dB) relative to 1 mW (dBm) per 10 MHz, anywhere within the DPA. FIG. 1 shows an incumbent 203 in an offshore DPA 20 near New York, a radar sensor 208, and users (secondary user 204.1, secondary user 204.2) managed by two SASs deployed near dynamic protection area 207.

Conventionally, to mitigate interference to an active DPA, each SAS exchanges its user information and uses a conventional "move list" algorithm to move users off the protected channel in the vicinity of the DPA. The conventional algorithm considers all protection points in the protected area. For any protection point and channel, it determines all the users within neighborhood and sorts them based on their median interference contribution from smallest to largest. The conventional algorithm finds a subset of the sorted list of users to be removed such that the 95th percentile of the aggregate interference from the remaining users is below the required threshold for all possible receiver azimuths of radar antenna. The overall move list for the DPA is the union of the move lists of all protection points. Due to its complexity, the move list is computed offline on a daily basis and only utilized when the DPA becomes active.

The conventional move list algorithm uses the irregular terrain model (ITM) in point-to-point mode with time variability to compute the path loss from each transmitter to the incumbent receiver. The time variability results in a piecewise lognormal probability distribution of the path loss. The effective isotropic radiated power (EIRP) of each transmitter is assumed fixed, therefore the received power at the incumbent from a transmitter is also piecewise lognormal.

The aggregate interference at the incumbent is taken as the power sum of all co-channel transmissions. Given the nature of the propagation model, the probability distribution of the aggregate interference power has no closed form expression and varies in each calculation. Since the conventional move list algorithm uses a Monte Carlo method to estimate the 95th percentile of the aggregate interference, the conventional move list algorithm causes uncertainty in move list results.

In view of a tight bound on the aggregate interference distribution, a simplification can remove both requirements. If a given p-th percentile upper bound of each interference contribution is below its allocated interference budget, then the p-th percentile of the aggregate interference is guaranteed to be below the sum of the allocated interference budgets.

Simplification

A tight bound on the distribution of aggregate interference is described and as well as interference criterion for each SAS based on that bound.

Bound on Interference Distribution

In general, the aggregate interference from multiple transmissions on a wireless channel at a receiver will have a probability distribution which may or may not be known. Even if the distribution of each individual contribution to the aggregate is known, the distribution of the aggregate may not have a closed form, e.g., as with the sum of lognormally distributed variates. In such cases, bounds on the distribution are useful.

Several concentration inequalities, e.g., Markov, Chebychev, Camp-Meidell, and Van Dantzig, are examined for potential bounds on the distribution of aggregate interference. The Van Dantzig inequality provides the tightest lower bound on the cumulative distribution of the aggregate interference as a function of just its first two moments:

$$Pr\{I \le x\} \ge \frac{8(x-\mu_I)^2}{3\sigma_I^2 + 8(x-\mu_I)^2}, \tag{1}$$

where I is the aggregate interference power, $\mu_I$ is its mean, and $\sigma_I^2$ is its variance. The bound is valid if the probability distribution of I has a second derivative, and its density function is convex at the tail. In fact, the bound can be applied to all unimodal continuous probability density functions in their convex part.

Solving (1) for x, we obtain an upper bound on the p-th percentile above the mean as $$x \le \sigma_I \sqrt{\frac{3p}{8(1-p)}} + \mu_I, x > \mu_I. \tag{2}$$

For example, the 95th percentile (p=0.95) is no more than $$\sigma_I \sqrt{\frac{57}{8}} + \mu_I.$$

Figure 2:
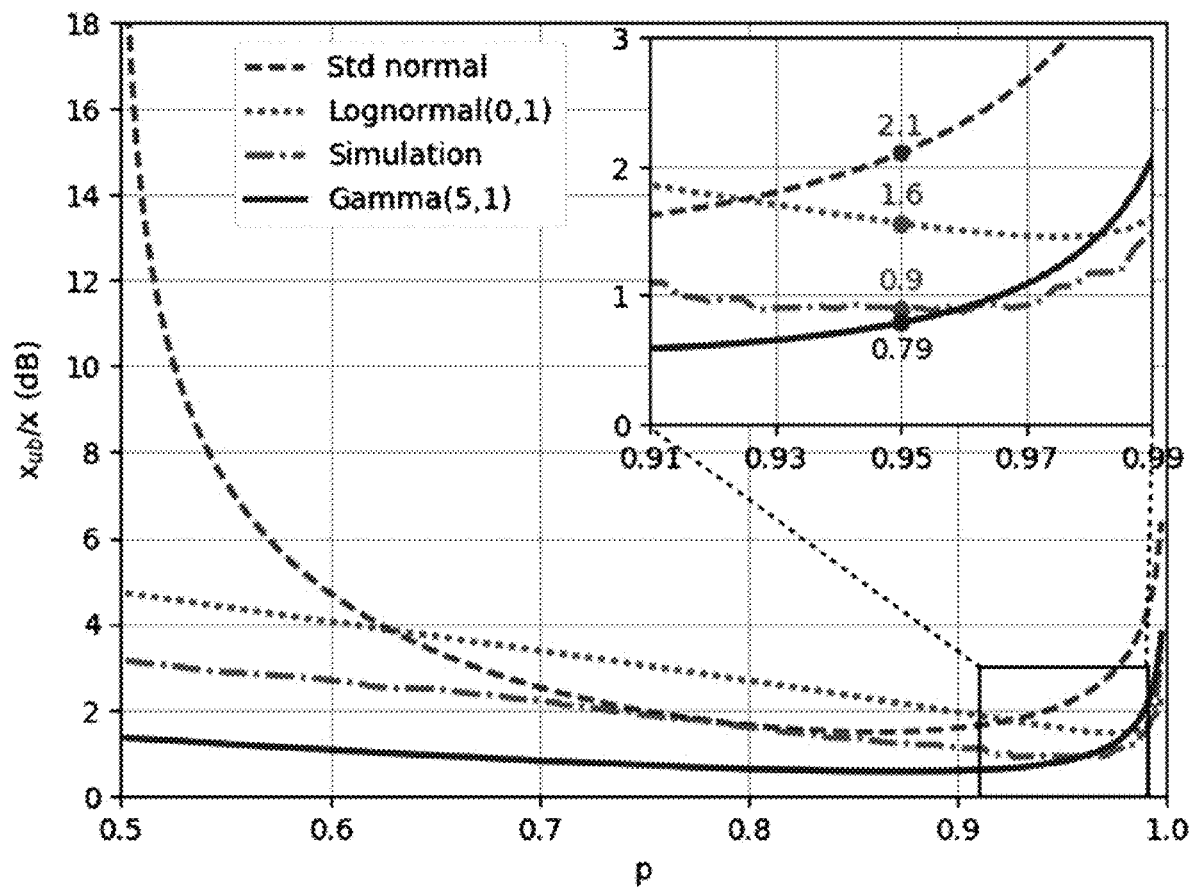
FIG. 2 shows a ratio of p-th percentile upper bound (2), $x_{ub}$, to the exact p-th percentile, x, for some distributions.

While the upper bound (2) only depends on the first two moments of a distribution, it is instructive to observe how loose or tight the bound is at different p values. FIG. 2 shows a graph for the ratio in decibels (dB) of the upper bound to the exact p-th percentile value as a function of p for four different distributions. They include a standard normal random distribution, motivated by the central limit theorem; a lognormal distribution, which has been used to approximate the sum of lognormal variates; a Gamma distribution, representing the power sum of signals that are independent and exponentially distributed in power (or Rayleigh distributed in amplitude); and finally, an unknown distribution (labelled as "simulation") that was computed as a sum of piecewise lognormal variates. While the bound can be loose near the median and extreme upper tail, it is quite reasonable around p=0.95, where it ranges from 0.8 dB for the gamma variate to 2.1 dB for the standard normal variate.

Individual SAS Interference Criterion

In CBRS, interference protection requirements for federal incumbents are stringent. SASs need to consider the worst case scenario, in which the incumbent is active and must be protected at a predefined interference threshold.

Let the incumbent protection requirement be that the p-th percentile of the aggregate interference power of all co-channel users does not exceed a threshold t. Furthermore, assume that the co-channel users are managed by M independent SASs, and that the j-th SAS is allocated an interference budget of $t_j$, such that $\Sigma_{j=1}^{M} t_j = t$. Now, let $N_j$ be the number of users managed by the jth SAS. Let $\mu_j = \Sigma_{n=1}^{N_j} \mu_{j,n}$ and $\sigma_j^1 = \Sigma_{n=1}^{N_j} \sigma_{j,n}^2$ be the total mean power and the variance, respectively, at the incumbent receiver of the $N_j$ users managed by the jth SAS. Note that, $\mu_{j,n}$ and $\sigma_{j,n}^2$ are the mean and variance, respectively, of the received power of the nth user of the jth SAS. Also, we assume the received powers are uncorrelated. Accordingly, Theorem 1 holds for this set of conditions.

Theorem 1: If each SAS manages its users such that $$\sigma_j \sqrt{\frac{3p}{8(1-p)}} + \mu_j \leq t_j, \quad 1 \leq j \leq M, \quad (3)$$

then the cumulative distribution of the overall aggregate interference, I, at the threshold t satisfies $$Pr\{I \leq t\} \geq p. \quad (4)$$

In other words, the pth percentile of the aggregate interference from all users managed by all M SASs does not exceed t.

From (3) and $\Sigma_{j=1}^{M} t_j = t$, we can show that $$\sum_{j=1}^{M} \left( \sigma_j \sqrt{\frac{3p}{8(1-p)}} + \mu_j \right) \leq \sum_{j=1}^{M} t_j \quad (6)$$

$$\sqrt{\frac{3p}{8(1-p)}} \sum_{j=1}^{M} \sigma_j + \sum_{j=1}^{M} \mu_j \leq t.$$

By induction that, we get $$\sqrt{\sum_{j=1}^{M} \sigma_j^2} \leq \sum_{j=1}^{M} \sigma_j. \quad (7)$$

Substituting (7) into (6) gives $$\sigma_I \sqrt{\frac{3p}{8(1-p)}} + \mu_I \leq t, \quad (8)$$

where $\mu_I = \Sigma_{j=1}^{M} \mu_j$ and $\sigma_I^2 = \Sigma_{j=1}^{M} \sigma_j^2$ are the total mean power and variance, respectively, of all M SASs' users at the incumbent receiver, assuming they are uncorrelated. Finally, (8) together with (2) guarantees that the exact pth percentile of I (i.e., x in (2)) does not exceed t.

The implication of the theorem is that, provided each SAS knows its interference budget $t_j$ and satisfies the simple rule in (3), the overall aggregate interference protection requirement of the incumbent (4) is guaranteed to be met. This method that involves the protection criterion is a vast simplification over the conventional procedure used for federal incumbent protection in CBRS. The method here removes both the need for global knowledge and the need to use the conventional move list algorithm that would apply to all SASs for a particular DPA. The tradeoff of using an upper bound for the percentile is that each SAS might be overly conservative in the interference management of its users. The analysis below sheds light on the extent of this spectral reuse tradeoff.

Numerical results are presented here for using the interference protection criterion in context of CBRS in the U.S. After describing the modeling assumptions, we present the results in terms of two metrics, including the total number of users moved from the channel in order to protect the incumbent (i.e., the size of the move list) and the realized aggregate interference of all co-channel users at the incumbent.

Modeling Assumptions

For this analysis, we use models for propagation, deployment, and interference management that have either been codified in CBRS standards, implemented in test certification software, or used in the CBRS community for similar analyses.

Given M SASs manage a total of N co-channel users in the neighborhood of a DPA, we assume a non-uniform assignment whereby approximately $$\frac{N \times j}{\sum_{j=1}^{M} j}$$

users are assigned to the jth SAS. We also considered another scenario, by which the users are divided uniformly among the M SASs, approximately $$\frac{N}{M}$$

users per SAS. However, since the results in both scenarios are similar, we present results of the non-uniform assignment scenario. The number, locations, antenna heights, and EIRP of transmitters are modeled.

We set the interference budget of the jth SAS, $t_j$, in proportion to the number of co-channel users, $N_j$, that the jth SAS manages in the neighborhood of the DPA protection point as $$t_j = \frac{N_j}{N} t \quad (5)$$

where t is the protection level of the DPA in watts. We use a deterministic operational move list method for calculating the local move list of a SAS, though in practice, an SAS is free to use any method to satisfy criterion (3).

Numerical Results

We first examine the results for a single DPA, i.e., DPA East7, in detail. Then we summarize the results for all DPAs along the U.S. coasts. The 95th percentile of aggregate interference threshold for all co-channel offshore DPAs is very stringent, i.e., −144 dBm/10 MHz, at every point in the DPA. The interference protection criterion is applied to $M \in \{1, 2, 3, 4, 5, 10\}$ SASs. Note that the case of M=1 (a single SAS) is equivalent to the conventional CBRS protection procedure, wherein each SAS has a global picture of the users and applies a conventional algorithm for determining the move list. The M=1 case serves as a baseline for comparison with the protection criterion applied to multiple SASs.

For DPA East7, we deployed N=59120 users in the neighborhood of the DPA. FIG. 3 lists results for move list size (second column) and maximum 95th percentile aggregate interference (dBm/10 MHz) (fourth column), as a function of the number of SASs. The maximum 95th percentile aggregate interference is computed over all protection points in the DPA and over all radar receiver azimuths. As the number of SASs increases, the number of users on move lists also increases, meaning the protection criterion is increasingly conservative. On the other hand, as the number of SASs increases, the number of remaining users (i.e., users not on move lists) decreases, resulting in a lower realized aggregate interference percentile, and always below the −144 dBm/10 MHz protection threshold.

FIG. 3 also shows the increase in move list size (third column) and the decrease in aggregate interference percentile (fifth column), from a single SAS to multiple SASs $M \in \{2, 3, 4, 5, 10\}$. Note that, we computed the increase in move list size as a percentage of the total number of co-channel users in the DPA neighborhood, N. For DPA East7, changes for both move list size and aggregate interference percentile are insignificant.

Figure 4:
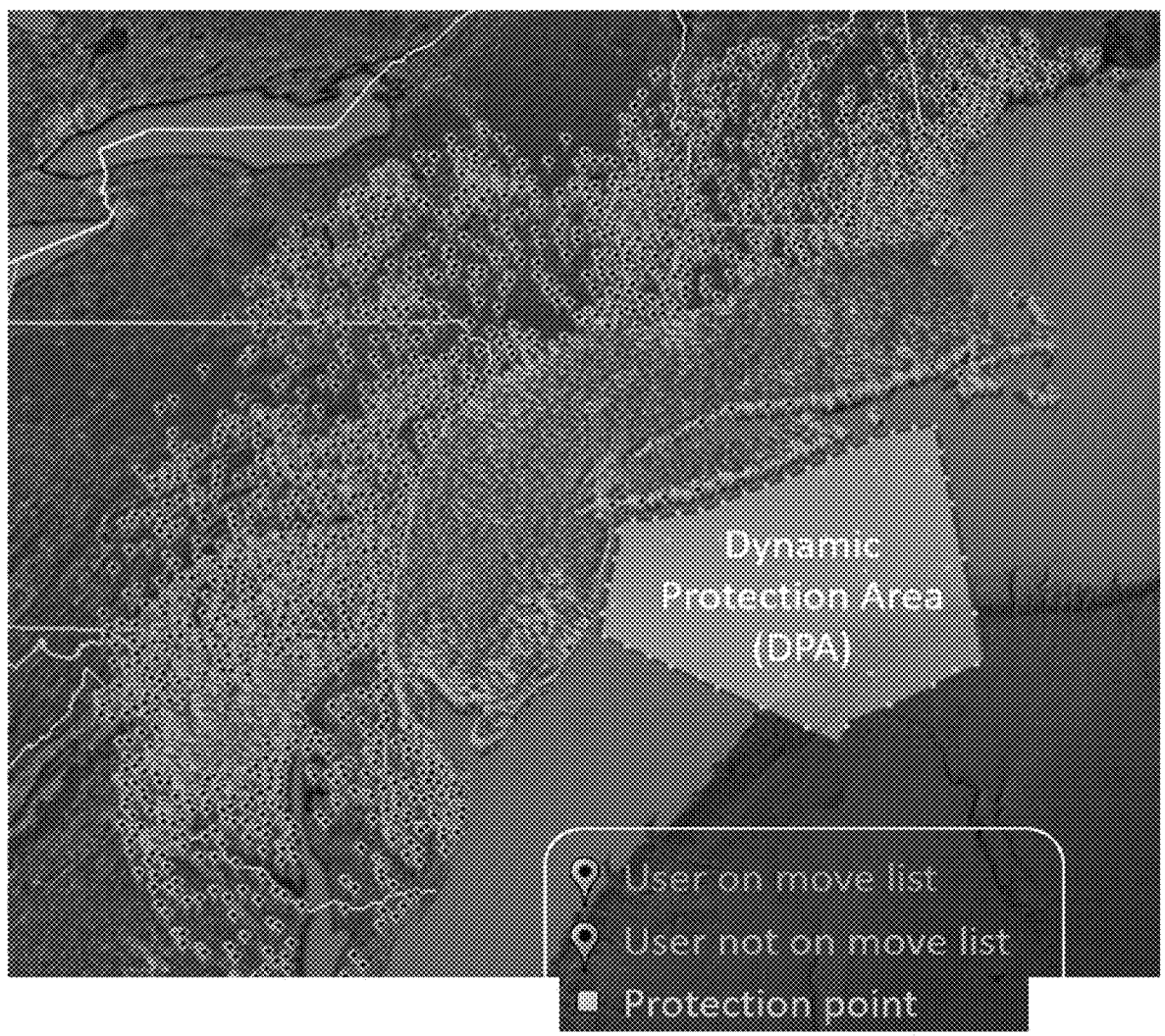
FIG. 4 shows a simulated move list for DPA East7.

FIG. 4 shows a geographic view of the move list in the case of a single SAS for DPA East7. Red and blue markers represent users on and off the move list, respectively. Green markers represent the protection points in the DPA that were used to compute the move list.

Figure 5:
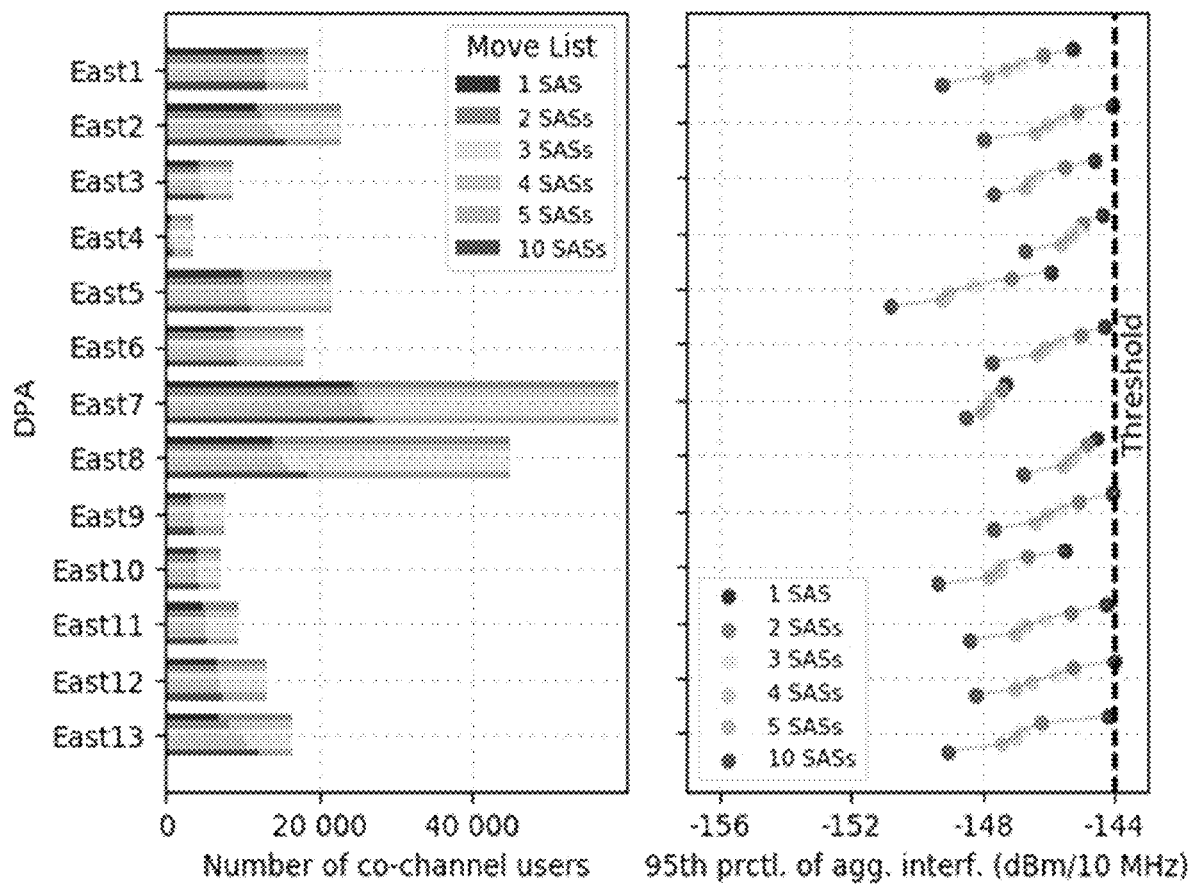
FIG. 5 shows a move list size and aggregate interference in dB relative to 1 mW (dBm) per 10 MHz, as a function of the number of SASs, for DPAs East1-East13.
Figure 6:
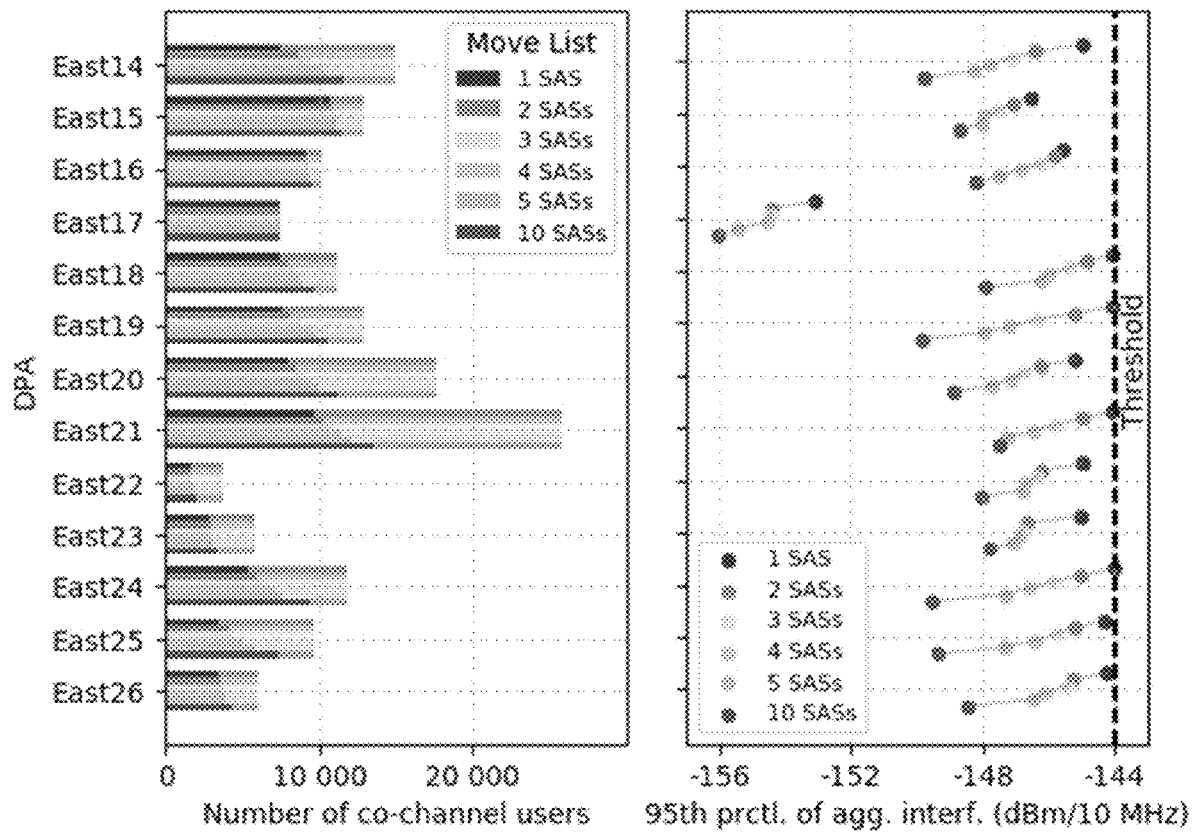
FIG. 6 shows a move list size and aggregate interference in dB relative to 1 mW (dBm) per 10 MHz, as a function of the number of SASs, for DPAs East14-East26.
Figure 7:
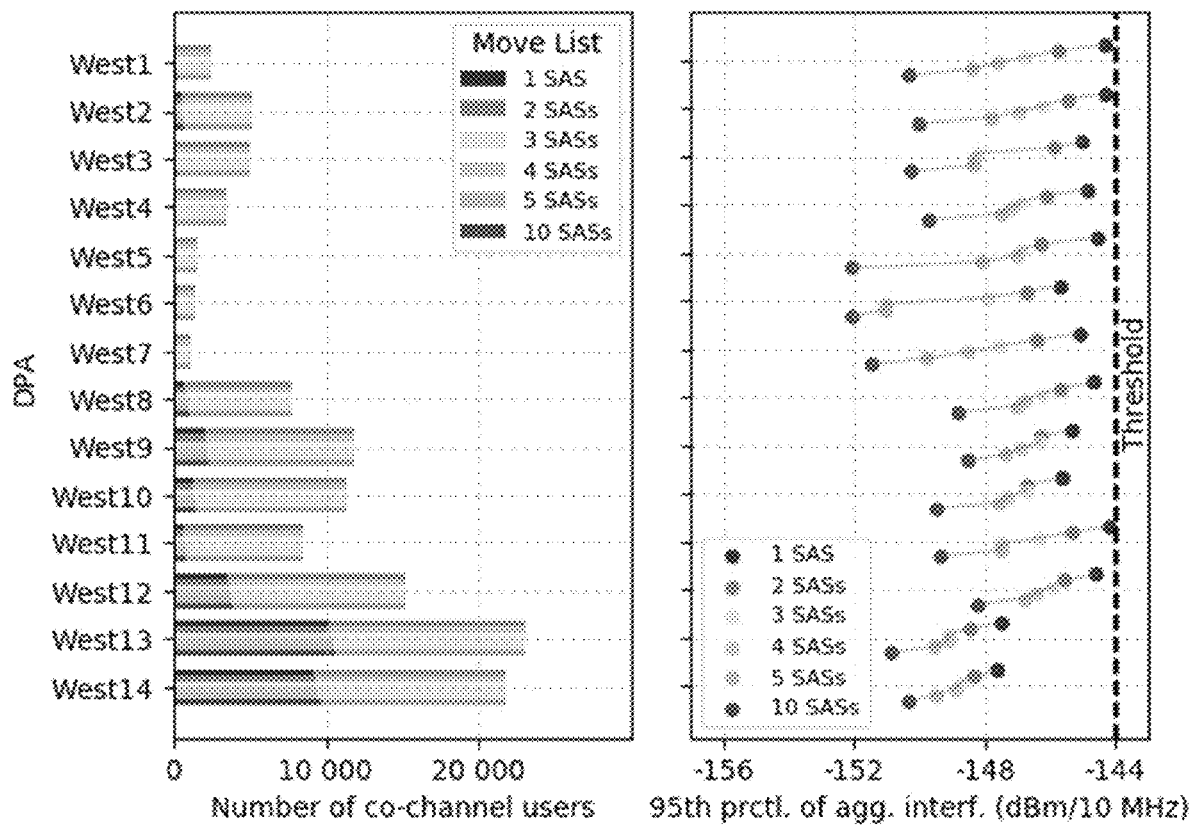
FIG. 7 shows a move list size and aggregate interference in dB relative to 1 mW (dBm) per 10 MHz, as a function of the number of SASs, for DPAs West1-West14.

FIG. 5, FIG. 6, and FIG. 7 show results for the 26 DPAs off the east and Gulf coasts (including DPA East7) and the 14 DPAs off the west coast of the continental U.S., for $M \in \{1, 2, 3, 4, 5, 10\}$ SASs. There are five independent SAS providers certified to provide commercial CBRS service.

Bar charts on the left in FIG. 5, FIG. 6, and FIG. 7 show both the total number of co-channel users in the neighborhood of the DPA and the number who are on move lists. Similar to the DPA East7 results, as the number of SASs increases, the number of users on move lists also increases. The increase in move list size, from one SAS to five SASs, varies in the range of [0.09, 24.05] % across all offshore DPAs. The high values are driven by a few DPAs (e.g., East13 and East25), in which independently managing wireless transmission is cautiously adding more users to the move lists to protect the incumbent. For all 40 DPAs, the median increase in move list size is only 2.69%, which is relatively small.

The line charts on the right in FIG. 5, FIG. 6, and FIG. 7 show the maximum realized 95th percentile of the aggregate interference in each case. As the number of SASs increases, the realized aggregate interference percentile decreases. The decrease in the aggregate interference percentile, from one SAS to five SASs for all DPAs, changes within the range of [0.74, 5.36] dB with a median of 2.36 dB. For most DPAs, the maximum realized 95th percentile is just below the −144 dBm/10 MHz threshold for a single SAS and gradually decreases as the number of SASs increases. However, a special case can be observed for the DPA East17, which has the max 95th percentile of aggregate interference much lower than −144 dBm/10 MHz for all values of M. This is because most users in the neighborhood of DPA East17 were put on the move list, regardless of the number of SASs.

It should be appreciated that independently managing wireless transmission provides advantages over conventional practice while ensuring interference protection to the federal incumbents in CBRS. Independently managing wireless transmission provides flexibility and innovation by SAS administrators. In independently managing wireless transmission, each SAS can manage its move list independently of others without the need to exchange detailed users information. Furthermore, each SAS independently can apply its own method for determining its move list without using the conventional move list algorithm.

Independently managing wireless transmission can involve spectral reuse that tends to grow with the number of SASs managing users in the same area. It may put more users on the move list than a more complex, precise solution. This causes the aggregate interference of all SASs' co-channel users to be lower than necessary to protect the incumbent. For future work, a tighter bound than the Van Dantzig's on the aggregate interference distribution could improve the spectral efficiency. While this work was motivated by federal incumbent protection in the 3.5 GHz band, independently managing wireless transmission is applicable to similar sharing arrangements in other bands, as well.

Example Deterministic Move Lists for Incumbent Protection in a Shared Spectrum Band The 3.5 GHz citizens broadband radio service (CBRS) band in the U.S. is a portion of mid-band spectrum shared between commercial operators and existing federal and non-federal incumbents. To protect the federal incumbents from harmful interference, a spectrum access system (SAS) can use a conventional move list algorithm to suspend transmissions of some CBRS devices (CBSDs) on channels in which the incumbent becomes active. However, the conventional reference move list implementation used for SAS testing is non-deterministic in that it uses a Monte Carlo estimate of the $95^{th}$ percentile of the aggregate interference from CBSDs to the incumbent. This leads to uncertainty in move list results and in the aggregate interference check of the test.

In contrast in independently managing wireless transmission, upper and lower bounds can be placed on the aggregate interference distribution to compute deterministic move lists. These include the reference move list used by the testing system and an operational move list used by the SAS itself. In this Example, independently managing wireless transmission makes deterministic move lists using reference implementations of the standards and simulated CBSD deployments in the vicinity of federal incumbent dynamic protection areas.

The 3.5 GHz citizens broadband radio service (CBRS) is known as an innovation band since it was the first mid-band spectrum opened up by the Federal Communications Commission (FCC) to commercial operators on a shared basis with existing federal and non-federal incumbents. This band provides 150 MHz of spectrum (from 3550 MHz to 3700 MHz) to new users and proves that spectrum sharing in the mid-band is feasible, and its model can be applied to other, similar bands.

In the CBRS architecture, the band is governed by a three-tiered spectrum authorization framework. The first tier includes the federal incumbents (e.g., Navy shipborne radars), existing fixed satellite service (FSS) earth stations, and grandfathered wireless broadband licensees. These users will be protected from harmful interference from lower tiers. The second tier consists of priority access licensees (PAL) within the first 100 MHz portion of the band. The third tier is general authorized access (GAA), which allows open and flexible access to all 150 MHz of the band. The GAA users are permitted to operate on unused channels by higher tiers without causing interference to those tiers.

In the ecosystem of the CBRS band, the CBRS devices (CBSDs) are fixed base stations/access points operating as PALs and GAA users to provide mobile broadband services to end user devices. The spectrum access system (SAS) is responsible for allocating spectrum resources (i.e., frequencies, power, etc.) to CBSDs as well as managing interference of lower tiers to higher tiers. The environmental sensing capability (ESC) is a sensor network that monitors the CBRS band for federal incumbent signals and notifies the SAS upon detecting an incumbent signal. The SAS then re-configures CBSDs to mitigate potential interference to the incumbent within 300 s.

The National Telecommunications and Information Administration (NTIA) has defined ESC-monitored dynamic protection areas (DPAs) that must be protected from harmful interference when an incumbent signal is detected within their limits. Most of the DPAs are coastal and typically begin 10 km offshore. However, there are some smaller, inland or port DPAs and even single-point DPAs at some sites. The DPA database for both the contiguous U.S. (CONUS) and outside of CONUS can be found in.

The Wireless Innovation Forum (WInnForum), an industry driven forum, has been developing CBRS standards and test software to foster successful deployment in the CBRS band. The standards specify a move list algorithm to pre-compute a list of CBSD transmissions that must be moved off a protected channel in the vicinity of a given DPA when an incumbent signal is detected in the DPA on the channel. The move list is designed to meet the required interference protection level, such that the $95^{th}$ percentile of the aggregate interference into the incumbent radar receiver antenna does not exceed a predefined protection threshold at every point in the DPA.

The current WInnForum test harness reference implementation of the conventional move list algorithm calculates a Monte Carlo estimate of the $95^{th}$ percentile of the aggregate interference. The problem with this conventional approach is that the result is non-deterministic, leading to uncertainties in move list size and in the aggregate interference check of the keep list. To mitigate this problem, uncertainty margins have been used in the WInnForum SAS test code for DPA protection pass/fail criteria. However, these margins were pre-computed based on a predetermined deployment and, hence, do not apply, in general, to other deployment scenarios. Another issue with this conventional approach is the high computational complexity of Monte Carlo estimation, especially for large deployments.

Independently managing wireless transmission provides benefits over conventional move list reference implementations. Specifically, instead of relying on a Monte Carlo estimate of the aggregate interference, independently managing wireless transmission can use upper and lower bounds on the aggregate interference distribution to obtain deterministic move lists. One of them is a reference move list, which can be used for testing the SAS. The other is an operational move list that the SAS can use. This Example compares performance of independently managing wireless transmission in terms of move list size and aggregate interference to the federal incumbent against the conventional non-deterministic implementation. The results are discussed for a single point DPA near Pensacola first, and in compact form for all coastal DPAs along the CONUS.

Calculation of aggregate interference, or co-channel interference, in wireless communications, wherein the aggregate interference is the accumulation of interference power from several sources. Since the attenuation due to shadowing in wireless channels is often modeled by the lognormal distribution, assume that the interference contribution from a single source is lognormally distributed. Therefore, some conventional technology focuses on computing the aggregate interference as a sum of lognormal random variables. Since there is no closed-form expression for the lognormal sum probability density function (PDF), several analytical approximations have been derived. Most of these approaches approximate the sum of lognormal random variables by another lognormal random variable. However, the distribution of the interference from an individual CBSD is not a lognormal distribution, and approximating the aggregate interference with another lognormal distribution may not be the best option in applications.

Another technique computes the PDF of a sum of two random variables on a logarithmic scale. The method can be applied recursively for more than two random variables, and it will give exact results for arbitrary distributions. A practical drawback of this method is that the results are not in closed form and extensive numerical integration is required. Given that thousands or millions of CBSDs may be deployed in the CBRS band in the near future, using this technique for aggregate interference calculation can be a burden for the SAS operators.

Recognizing the limitations of conventional methods, we estimate strict upper and lower bounds on the cumulative distribution function (CDF) of the sums. Interference contributions are independent but non-identically distributed so upper and lower bounds are suitable. Because these random variables are not lognormally distributed, generalizations applicable to non-lognormal distributions are used. The upper bound is tight especially for random variables with large standard deviations. The lower bound is loose.

To search for tighter lower bounds on the CDF, classic concentration inequalities are considered. The concentration inequalities relate the tail area probabilities of a random variable to its moments. Among these inequalities, the inequalities, which were derived by Markov, Chebyshev, Camp-Meidel, and Van Dantzig, are appropriate for this application.

Commercial Deployment Model

The simulated deployments used were derived from a model used by the NTIA. The NTIA model generates the locations, antenna heights, and transmission powers of a simulated deployment of CBSDs around a given DPA. The numbers of CBSDs and their locations are a function of population, land classification, and many other factors including daytime traveling factor, market penetration factor, and channel scaling factor.

There are two categories of CBSDs in the CBRS band. Category A CBSDs are lower power devices with a maximum effective isotropic radiated power (EIRP) of 30 dBm/10 MHz (i.e., 30 dB relative to 1 mW (dBm) in a 10 MHz channel) and are typically installed indoors. Whereas, Category B CBSDs are higher power devices (47 dBm/10 MHz maximum EIRP) and are professionally installed outdoors. For this study, Category A CBSDs and Category B CBSDs were placed as far as 250 km and 600 km, respectively, from the DPA boundary. Furthermore, all CBSD antennas were configured to be omnidirectional. Sample deployments generated with the NTIA model are available.

Figure 8:
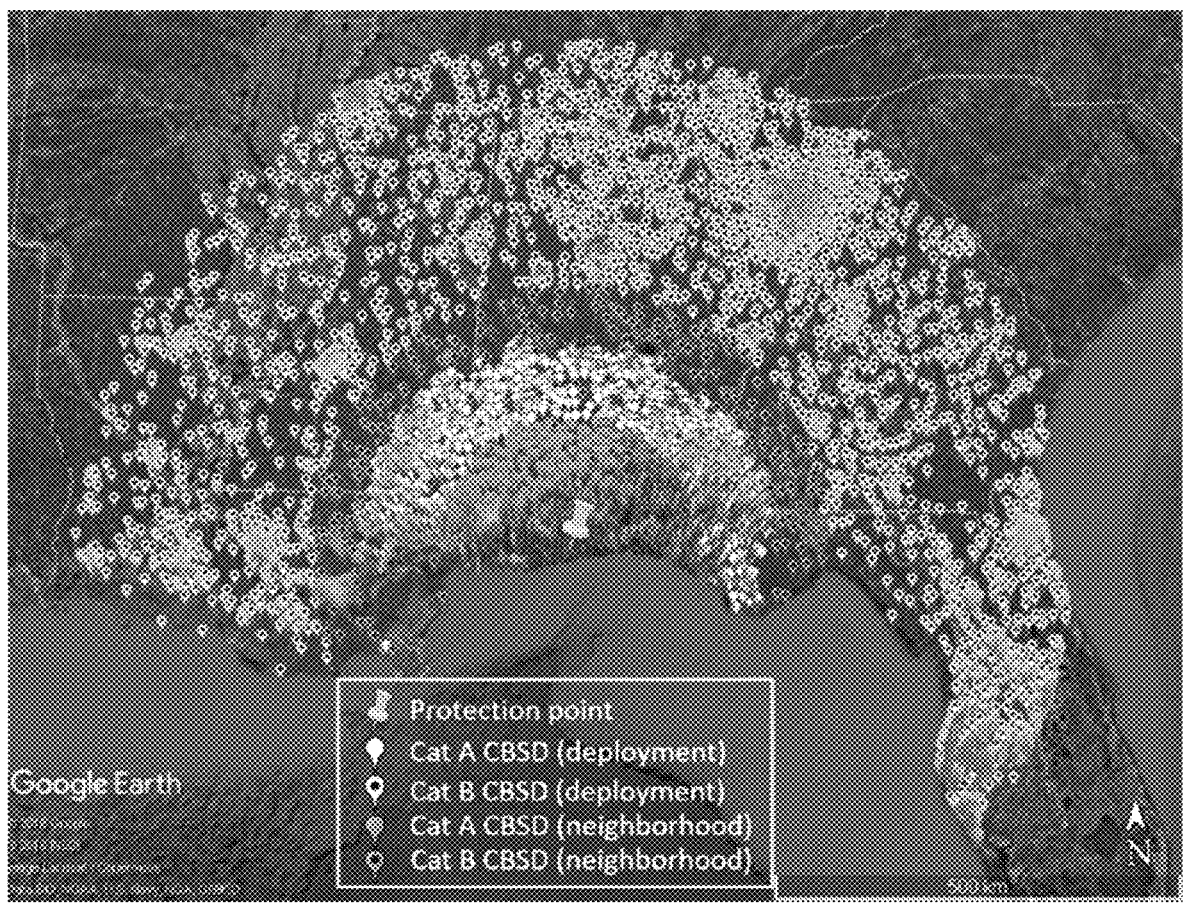
FIG. 8 shows a simulated deployment of CBSDs near Pensacola.

FIG. 8 shows an example of a simulated deployment of CBSDs near Pensacola DPA, which is a single point protection area. The yellow pin indicates the protection point, markers without dots represent Category A CBSDs, and markers with dots represent Category B CBSDs. Even though there are 14409 CBSDs (in white markers) deployed around the protection point, only a subset of these CBSDs within the "neighborhood" of the protection entity will be included in the aggregate interference calculation, per CBRS SAS standards. In this example, given the neighborhood distances of 150 km and 304 km for Category A and Category B CBSDs, respectively, only 5161 CBSDs (in red markers) are counted to be within the neighborhood. DPA-specific neighborhood distances and protection criteria can be found in DPA keyhole markup language (KML) files provided by NTIA.

Propagation Model

CBRS standards require a SAS to use the irregular terrain model (ITM) (also known as the Longley-Rice model) in point-to-point mode for the calculation of aggregate interference to federal incumbents. The ITM model does not include clutter loss, hence, it is regarded as a conservative model for interference protection. However, to account for building attenuation, which is also absent in the ITM model, 15 dB is added to the loss if the CBSD is located indoors. Other parameters used in the ITM model are provided in the WInnForum requirements document. An open-source reference implementation of the ITM model is available, as are the terrain and other data used by the model.

The output of the ITM model is a quantile $$A = \begin{cases} A', & \text{if } A' \geq 0 \\ A' \frac{29-A'}{29-10A'}, & \text{otherwise} \end{cases} \quad \text{and} \quad (1)$$

$$A' = A_{ref} - V_{med} - Y_T - Y_L - Y_S \quad (2)$$

where $A_{ref}$ is a reference attenuation, $V_{med}$ is an adjustment from the reference attenuation to the all-year median, and $Y_T, Y_L, Y_S$ are deviations due to time, location, and situation variables, respectively.

While $A_{ref}$ and $V_{med}$ are deterministic for a specific path, the values of $Y_T, Y_L, Y_S$ vary and depend on three standard normal deviates, $z_T, z_L, z_S$. These deviates are defined as $$z_T = z(q_T), \; z_L = z(q_L), \; z_S = z(q_S) \quad (3)$$

where $q_T, q_L,$ and $q_S$ are the desired fractions of time, locations, and situations, respectively, and $z(q) = Q^{-1}(q)$ is the inverse function of the complementary normal distribution.

In the ITM point-to-point mode, since there is no location variability, $q_L$ is set equal to 0.5, and thus, $z_L = 0$ and $Y_L = 0$. Because broadcast mode is used in the model (mode of variability (MDVAR)=13), time variability and situation variability are measured by reliability and confidence, respectively. Fixing the confidence parameter to 0.5 results in $q_S = 0.5$, and thus, $z_S = 0$ and $Y_S = 0$. Therefore, the time deviation $Y_T$ is the only remaining non-zero variate in (2).

Time deviation $Y_T$ is piece-wise linear in $z_T$ as follows $$Y_T = \begin{cases} \sigma_{T_{minus}} z_T, & z_T \leq 0 \\ \sigma_{T_{plus}} z_T, & 0 \leq z_T \leq z_D \\ \sigma_{T_{plus}} z_D + \sigma_{TD}(z_T - z_D), & z_D \leq z_T \end{cases} \quad (4)$$

where $\sigma_{T_{minus}}$ and $\sigma_{T_{plus}}$ are the slopes and can be computed. The constants $z_D$ and $\sigma_{TD}$ are related to ducting effects, and their values depend on the climate. Given $Y_T$ is piece-wise linear in $z_T$, which is the inverse function of the complementary normal distribution of $q_T$, it is clear that $Y_T$ is not simply a normal distribution of $q_T$. Hence, the path loss quantile output from the ITM model as a function of the reliability parameter, $q_T$, does not follow a normal distribution.

To illustrate the quantiles of the attenuation distribution in the ITM model, we compute the path loss from a Category A CBSD to the protection point in Pensacola. The CBSD is located indoors and is about 99 km away from the protection point. The climate value is maritime temperate overland. We use 10000 reliability values, evenly spaced in the interval [0.001, 0.999].

Figure 9:
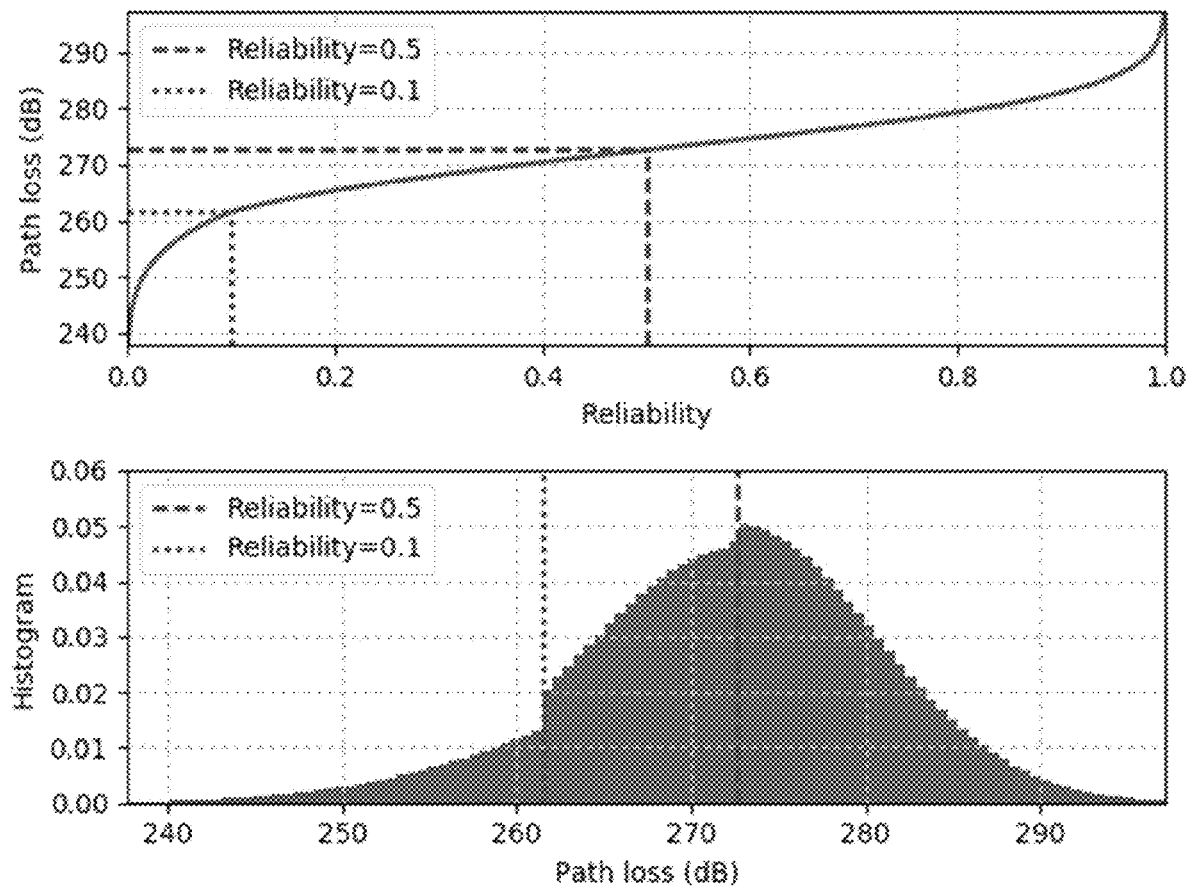
FIG. 9 shows a path from a Category A CBSD to a single protection point in Pensacola DPA.

FIG. 9 shows the path loss variation of the selected path. The first subplot shows the path loss versus reliability, and the second subplot shows the path loss histogram. Although it is not apparent in the first subplot, the second subplot clearly shows that the path loss distribution has three distinct regions with transitions at reliability values of 0.1 (green dotted line) and 0.5 (red dashed line) directly associated with the three quantile regions in (4). This can be explained by the fact that reliability values of 0.1 and 0.5 are associated with the deviate values $z_T$ of 1.282 and 0, respectively, and because $z_D$ for maritime temperate overland climate is equal to 1.282.

Conventional Move List Algorithm

Regulatory rules include the SAS operators to manage their CBSD transmissions (tier 2 and tier 3) to protect the operations of existing incumbents (tier 1) in the band. To fulfill the requirement, CBRS standards specify a conventional move list algorithm to be executed by all SASs.

Given a set of CBSD transmissions that overlap in frequency with a protected frequency range, the move list algorithm identifies which transmissions must be suspended (and possibly relocated to a different channel) to avoid excessive interference in a protected federal incumbent area. In the CBRS specifications, an authorization to transmit is called a "grant." Hence, a move list is a list of grants that must be suspended when a federal incumbent protection area becomes active. Reasons for activation of a protection area on a given channel include detection of a federal incumbent signal within the protection area on that channel.

To obtain the move list, the algorithm computes the path loss from each CBSD to a point in the protected area and, using a stochastic model for the loss on each link, computes the $95^{th}$ percentile of the aggregate interference at that point. The algorithm then chooses a subset of the grants that must be suspended (relocated) such that the $95^{th}$ percentile of the aggregate interference is below a threshold at any point in the protected area.

Pseudocode for the conventional move list algorithm is shown in FIG. 10. For any protection point p within a given protection area DPA and for any protected frequency range ch, the conventional move list algorithm first determines a set of $N_c$ grants that are within a neighborhood of the protection point p and having or requesting a grant that includes any portion of the protected frequency range ch (Line 2). It then sorts the grants by their median interference contribution to the protection point from smallest to largest (Line 3). The median interference contribution, $I_{i,median\,(dBm)}(p,ch)$, of the $i^{th}$ grant to the protection point p on frequency range ch (dBm) can be computed as follows:

$$I_{i,median(dBm)}(p,ch) = P_i(ch) + G_{tx,i}(p) - L_{i,median}(p) \quad (5)$$

where $P_i(ch)$ is the conducted power of the $i^{th}$ grant on frequency range ch in dB relative to 1 mW (dBm), $G_{tx,i}(p)$ is the transmit antenna gain in the direction of point p in dB relative to isotropic (dBi), and $L_{i,median}(p)$ is the median path loss from the transmitter to point p (dB). It is important to note that $I_{i,median(dBm)}$ (p,ch) does not include the receive antenna gain, which might lead to a sub-optimality of the conventional algorithm; but the advantage is that the sort need only be done once per protection point and all the subsequent calculations can be parallelized.

However, when computing the statistical interference contribution of an individual grant, and then, the aggregate interference, the algorithm takes into account all possible azimuth directions of the incumbent receiver antenna. The azimuth angles are computed by using increments of half beamwidth over the azimuth range of the given DPA, where the beamwidth and azimuth range are defined for each DPA. For each possible receive antenna azimuth, it must apply the gains of the transmit and receive antennas accordingly, depending on the bearing of each transmitter relative to the protection point to compute the interference contribution $I_{i(dBm)}(p,ch)$ (dBm) as:

$$I_{i(dBm)}(p,ch) = P_i(ch) + G_{tx,i}(p) - L_i(p) + G_{rx,i}(p,a) \quad (6)$$

where $L_i(p)$ is a sample of the random path loss from the transmitter to point p (dB) computed using Monte Carlo simulation with a minimum of 2000 trials, and $G_{rx,i}(p,a)$ is the receive antenna gain given the azimuth direction, a.

For the sake of notational simplicity, let $I_{i(dBm)}$ represent $I_{i(dBm)}$ (p,ch). Then, we define $\{I_{1(dBm)}, \ldots, I_{i(dBm)}, \ldots, I_{N_c(dBm)}\}$ as a set of $N_c$ independent, but not necessarily identical, random variables, each representing the interference contribution from a CBSD to protection point p on frequency range ch. The associated interference contribution in linear scale (mW) can be computed as $I_i = 10^{I_{i(dBm)}/10}$, for $1 \leq i \leq N_c$. Consequently, the aggregate interference I (mW) of a subset of n sorted grants, $n \leq N_c$, is the sum of the interference contribution of grants $I_1, \ldots, I_i, \ldots I_n$ In as follows $$I = \sum_{i=1}^{n} I_i = \sum_{i=1}^{n} 10^{\frac{I_{i(dBm)}}{10}} \quad (7)$$

and I (mW) can be converted to log scale by $I_{(dBm)} = 10 \log_{10} I$.

For all potential receiver azimuths, the algorithm finds the largest keep list (portion of the sorted list that can be kept), i.e., largest n, so that the $95^{th}$ percentile of the aggregate interference, I, of these grants does not exceed the protection threshold (Line 5). This step is analogous to that of finding the largest keep list for each receiver azimuth, and then, taking the intersection of these keep lists. Note that the reference implementation of the algorithm uses Monte Carlo techniques to compute the $95^{th}$ percentile of the aggregate interference. The grants that must be removed to meet the protection threshold are placed on the move list (Line 7). This process is repeated for every protection point in the protection area, and the move list for the protection area is the union of the move lists of the points (Line 9).

To better understand the algorithm, let us reconsider the example of the Pensacola DPA. Recall that this is a single point DPA and there are 5161 CBSDs within the neighborhood of the protection point.

FIG. 11(a) shows histograms of 2000 Monte Carlo samples of the individual interference contribution, $I_{i(dBm)}$, computed using (6), at the receiver azimuth of 261°. To avoid overcrowding the figure, we only show representative histograms at grant indices i=[1, 200, 400, . . . , 4800, 5000, 5161]. Because grants are sorted by their median interference contributions (without considering the receive antenna gain), most of the histograms are shown to be gradually shifted to the right as the grant index i increases. Some of the histograms are out of order indicating that these grants are inside the main beam of the receive antenna. This is because the grants are ordered based on the median interference without the receive gain, but the plotted histograms do incorporate the receive gain. Furthermore, it can be seen from the figure that not only the median but also the variance can vary considerably from one grant to another.

FIG. 11(b) depicts the histogram of the aggregate interference, $I_{(dBm)}$, of the first n sorted grants at the protection point. To be consistent with FIG. 11(a), n is selected to be in [1, 200, 400, . . . , 4800, 5000, 5161]. As the number of grants n increases, the median increases. Although the variance in linear scale (mW) also increases with the increase of n, the variance in log scale (dB) (as shown in the figure) does not necessarily increase. However, it is clear that the aggregate interference distribution depends heavily on the distribution of the largest interference contribution among these grants.

Figure 12:
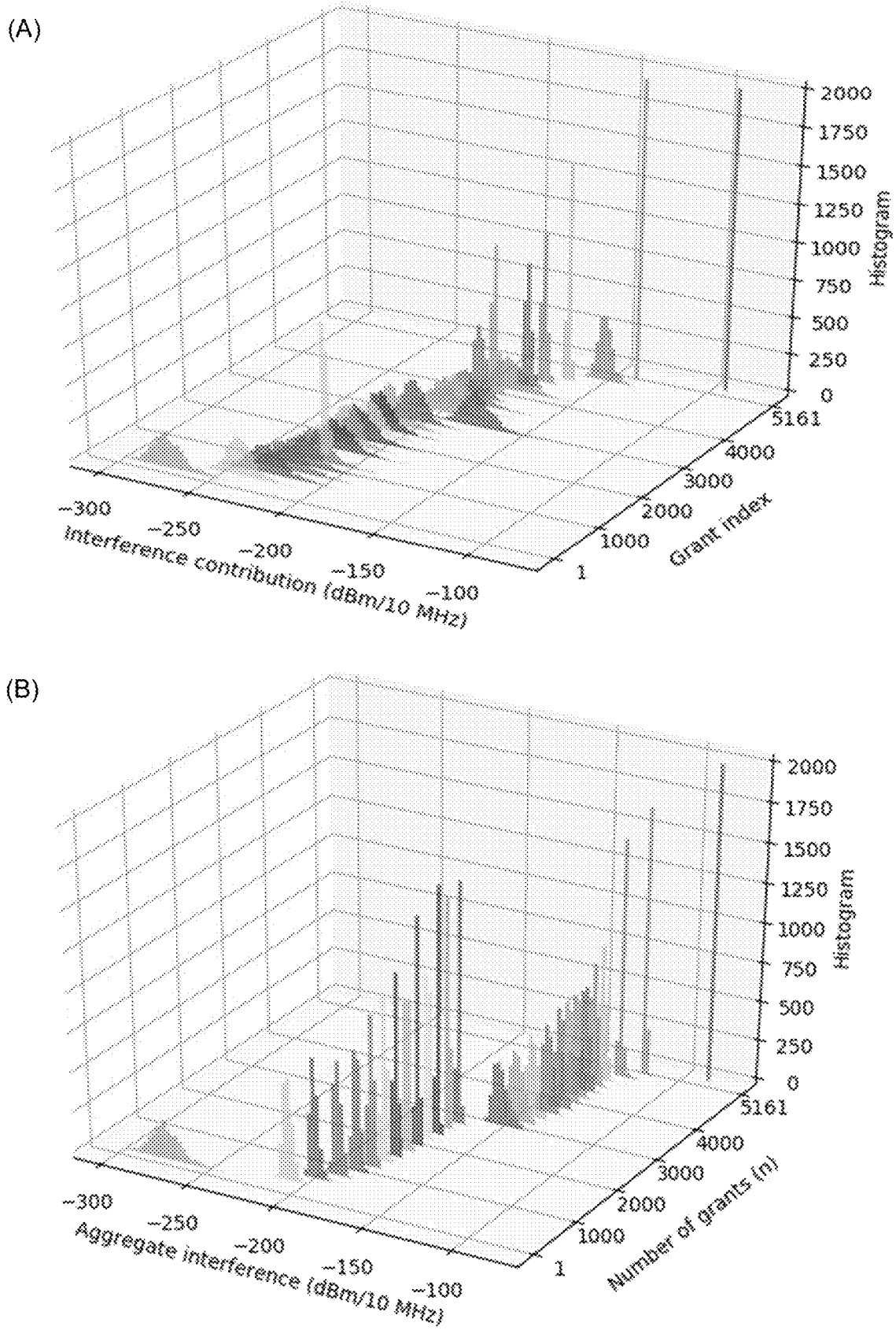
FIG. 12 shows aggregate interference of keep list, Pensacola DPA.

Next, we executed the conventional move list algorithm to obtain the move list for the Pensacola DPA. Note that the Pensacola DPA has only one protection point with a protection threshold of −139 dBm/10 MHz. Out of 5161 grants in the neighborhood of the protection point, the algorithm generates a move list of size 2320 grants, leaving 2841 grants on the keep list. To check the performance of the algorithm, we calculated the aggregate interference at the protection point at the worst receiver antenna azimuth of 261° at which the incumbent receives the maximum aggregate interference. FIG. 12 shows the normalized histogram and CDF of the aggregate interference of the keep list. The $95^{th}$ percentile of the aggregate interference was computed to be −138.79 dBm/10 MHz, which is slightly higher than the required protection threshold but within the uncertainty margin of the Monte Carlo process.

Figure 13:
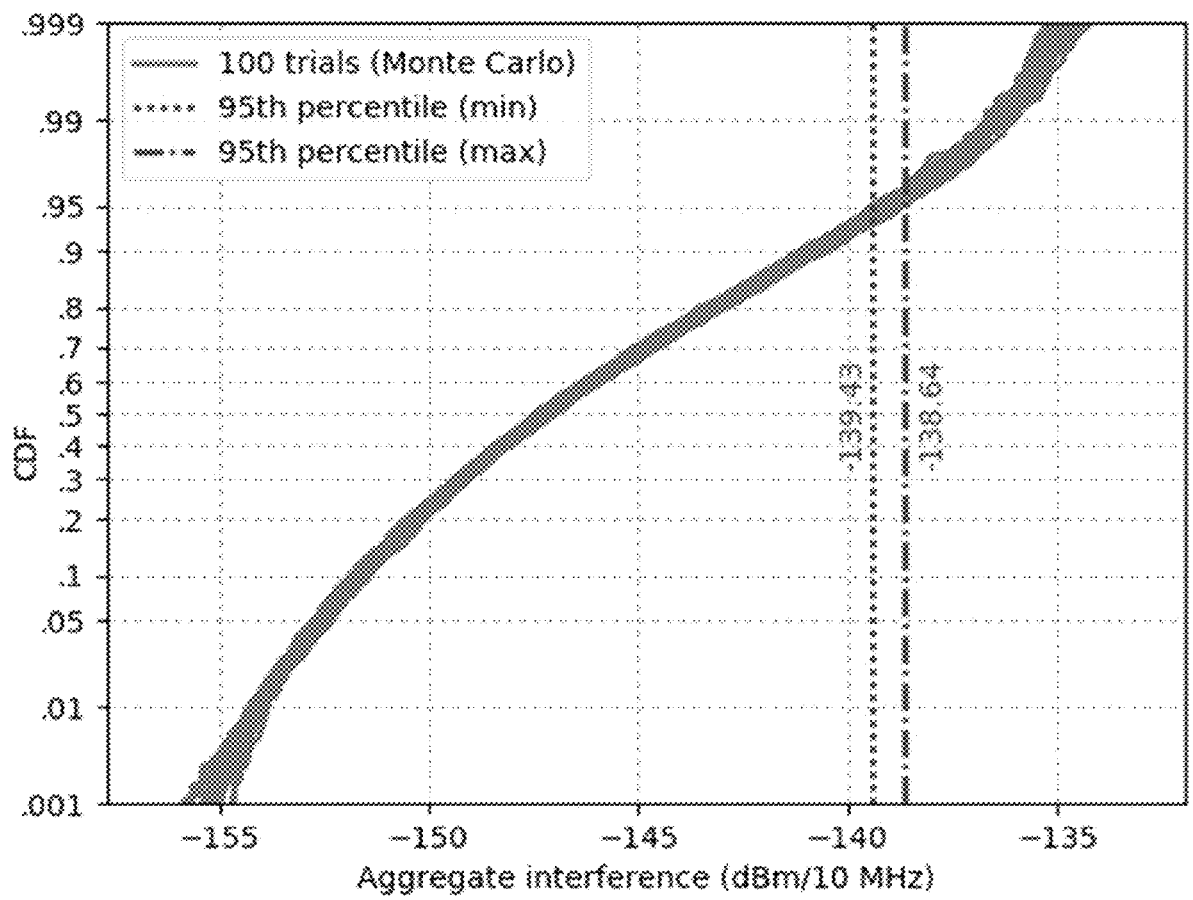
FIG. 13 shows uncertainty in aggregate interference of keep list, Pensacola DPA.

The uncertainty of the aggregate interference percentile, inherited from the Monte Carlo process, is the key issue addressed by this paper. The aggregate interference sample distribution changes, even with the same keep list size, every time we repeat the calculation. FIG. 13 shows the aggregate interference CDFs of the same keep list of size 2841 computed by 100 different Monte Carlo processes. The uncertainty is especially large at the head and tail portions of the distributions. We observe that the $95^{th}$ percentile of aggregate interference varies in the range of [−139.43, −138.64] dBm/10 MHz around the protection threshold of −139 dBm/10 MHz. To deal with this issue, uncertainty margins are added to the aggregate interference check in the WInnForum SAS test code for DPA protection pass/fail criteria.

Figure 14:
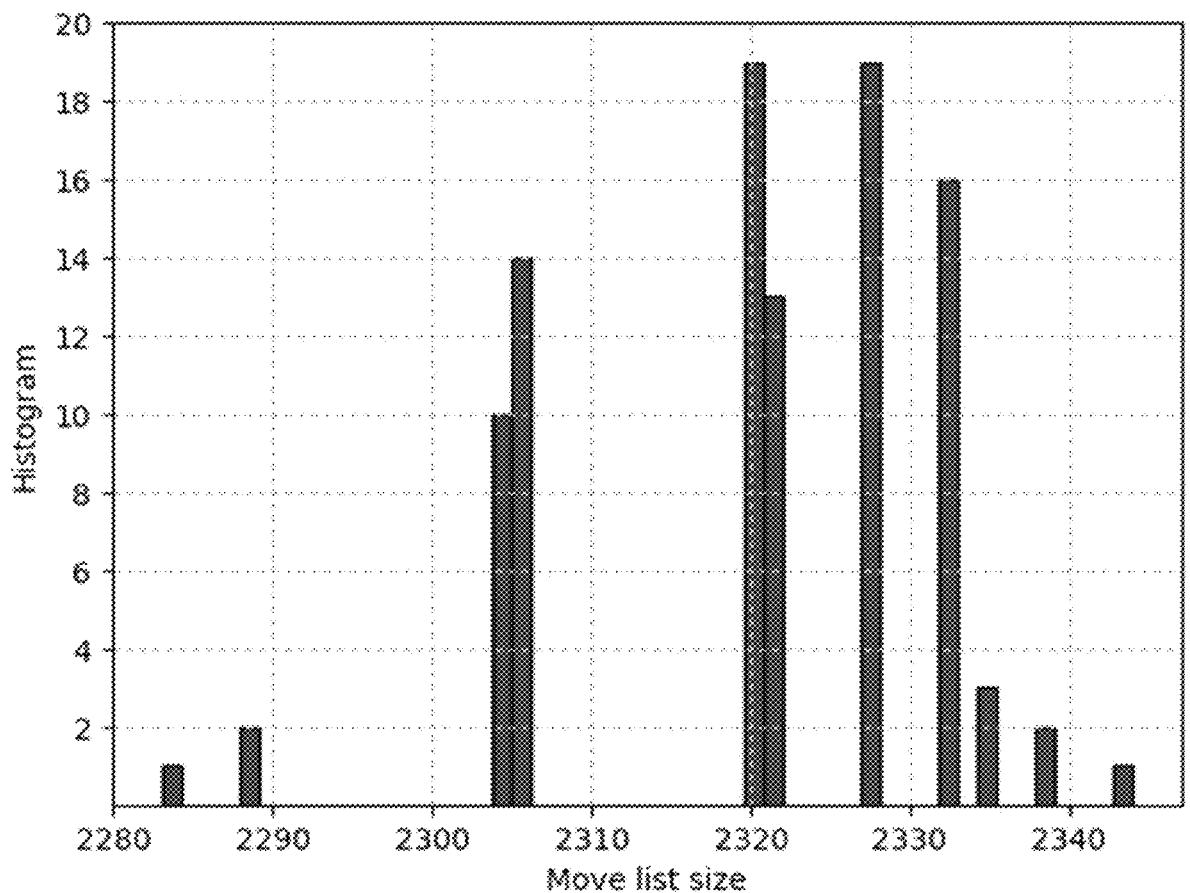
FIG. 14 shows uncertainty in move list size, Pensacola DPA.

The uncertainty in the aggregate interference calculation also affects the move list size. FIG. 14 shows the variation in move list size for 100 trials, ranging from 2283 to 2344 grants. The inconsistency in move list calculation is undesirable in an operational setting, especially in a multi-SAS environment.

Deterministic Move List Algorithms

Because of the uncertainty in the current test harness reference aggregate interference calculation, it is desirable to develop an alternative that can give deterministic results. As shown in FIG. 12, the aggregate interference distribution on a log scale is not a standard normal distribution, and hence, it is not lognormally distributed on a linear scale. Therefore, approximating the aggregate interference with a lognormal random variable does not seem to be a promising solution. Another alternative is logarithmic convolution to compute the PDF of a power sum of two random variables. This method gives exact results for arbitrary distributions, but numerical integration is needed and it is computationally expensive. For these reasons, we use strict upper and lower bounds on the distribution of the aggregate interference. This method gives deterministic results and is computationally inexpensive. The drawback is that it cannot give exact results, and the bounds are only applicable to certain types of distributions.

Bounds on the Distribution of Aggregate Interference

We introduce upper and lower bounds on the distribution function of the aggregate interference. In other words, we estimate upper and lower bounds of the CDF of I, which is a sum of N independent, but not necessarily identical, random variables $I_i$, where $1 \leq i \leq N$, as shown in (7). These bounds are given in closed form and can be computed easily without the need for Monte Carlo simulation.

Order Statistics Based Bounds

The upper and lower bounds of the aggregate interference distribution rely on the order statistics. Let $I_{max} = \max(I_i)$ denote the maximum of the N random variables for every outcome. Then, the upper and lower bounds of the random variable I can be obtained as:

$$I_{max} \leq I \leq NI_{max} \quad (8)$$

Upper Bound

From the first inequality in (8), i.e., $I_{max} \leq I$, and $\forall x>0$, it can be shown that $$P(I \leq x) \leq P(I_{max} \leq x) \quad (9)$$

where, $$P(I_{max} \leq x) = P(I_1 \leq x, \ldots, I_i \leq x, \ldots, I_N \leq x) \quad (10)$$

$$= P(I_1 \leq x) \ldots P(I_i \leq x) \ldots P(I_N \leq x)$$

$$= \prod_{i=1}^{N} P(I_i \leq x)$$

Let $F_X(x)=P(X \leq x)$ be the CDF of any random variable X. Then, the upper bound of the CDF of I can be obtained as follows:

$$F_I(x) \leq \prod_{i=1}^{N} F_{I_i}(x) \quad (11)$$

Lower Bound

Similar to the upper bound, from the second inequality in (8), $I \leq NI_{max}$, we can obtain the lower bound for the aggregate interference distribution I as follows:

$$F_I(x) \geq \prod_{i=1}^{N} F_{I_i}\left(\frac{x}{N}\right) \quad (12)$$

The upper bound indicates that the sum is dominated by the maximum of the N random variables whereas the lower bound is obtained when the N random variables have the same outcome. Therefore, we would expect a tight upper bound especially for random variables with large standard deviations. The lower bound, on the other hand, is expected to be loose since the occurrence of its event is quite low.

To improve these bounds, tighter bounds were placed on the distribution by adding the contribution of the minimum and second maximum values of the N random variables to the upper bound and lower bound. However, these tighter bounds require the computation of the joint distribution functions, which can be inconveniently obtained through numerical integration. Nevertheless, the tighter upper bound is similar to the previous upper bound, while the tighter lower bound is tighter than the previous lower bound but not significantly. Hence, we only make use of the upper bound in (11) in our analysis.

Moments Based Lower Bounds

We use concentration inequalities to compute lower bounds of the CDF. In probability theory, the concentration inequalities relate the tail probabilities of a random variable to its statistical moments. Therefore, they provide bounds of the deviation of a random variable away from a given value (e.g., mean value). Here, we focus our work only on a few inequalities that seem to be mostly applicable to our problems. Specifically, these inequalities were derived by Markov, Chebychev, Camp-Meidell, and Van Dantzig.

Let $\mu_I = E[I]$ and $\sigma_I^2 = E[(I - \mu_I)^2]$ be the mean and variance of I, respectively. Since $I_i$ are independent random variables, the mean and variance of the sum can be computed as the sum of means and variances, respectively. In other words, $\mu_I = \sum_{i=1}^{N} \mu_{I_i}$, and $\sigma_I^2 = \sum_{i=1}^{N} \sigma_{I_i}^2$, where $\mu_{I_i}$ and $\sigma_{I_i}^2$ are the mean and variance of each random variable $I_i$.

Markov's Inequality

The Markov inequality is a fundamental inequality from which other inequalities, e.g., Chebychev's inequality, can be derived. Markov's inequality depends only on the mean of the variable. If I is a random variable taking only non-negative values, then $\forall x>0$, $$P(I \geq x) \leq \frac{\mu_I}{x} \quad (13)$$

Chebychev's Inequality

Since we only need to compute the lower bound of the CDF, we will only focus on the one-sided Chebyshev inequality, which is also called Cantelli's inequality. Let I be a random variable with finite expected mean and variance, then $\forall x>0$, $$P(I \geq \mu_I + x) \leq \frac{\sigma_I^2}{\sigma_I^2 + x^2} \quad (14)$$

Camp-Meidell's Inequality

The Camp-Meidell inequality shows that, $\forall x \geq 0$:

$$P(I \geq \mu_I + x) \leq \frac{4\sigma_I^2}{4\sigma_I^2 + 9x^2} \quad (15)$$

The Camp-Meidell inequality requires unimodality of the PDF of I, which is possessed by many continuous distributions such as uniform, Gaussian, lognormal, Weibull, etc. In its two-sided version, the Camp-Meidell's inequality justifies the so-called "three-sigma rule," which states that 95% of the values are in the interval $[\mu_I - 3\sigma_I, \mu_I + 3\sigma_I]$.

Van Dantzig's Inequality

The Van Dantzig inequality shows that, $\forall x>0$:

$$P(I \geq \mu_I + x) \leq \frac{3\sigma_I^2}{3\sigma_I^2 + 8x^2} \quad (16)$$

This inequality requires existence of the second derivative of the probability distribution of I and convexity on the density of I. It can be applied to all the unimodal continuous probability laws in their convex part. The tail of most of the classical PDFs is convex as in our case. Although we have only shown the equations for the complementary CDFs of I, i.e., $P(I \geq x)$, the corresponding CDFs can be easily computed as $F_I(x) = P(I \leq x) = 1 - P(I \geq x)$.

Figure 15:
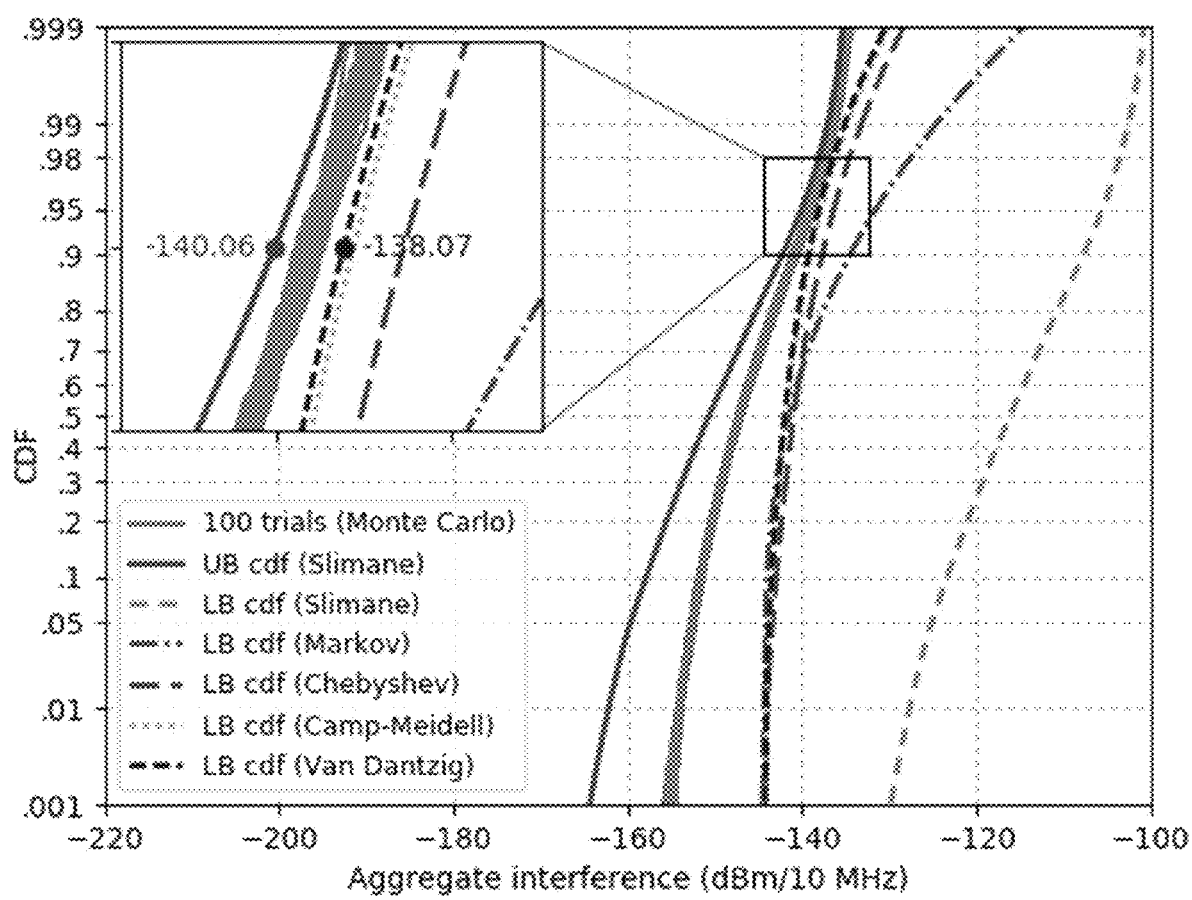
FIG. 15 shows bounds of aggregate interference distribution, Pensacola DPA.

To evaluate these bounds, we compute their CDFs and plot them against the aggregate interference distributions of the keep list in Pensacola DPA. FIG. 15 shows Slimane's upper bound (in red), Slimane's lower bound (in cyan), Markov's lower bound (in magenta), Chebychev's lower bound (in green), Camp-Meidell's lower bound (in yellow), and Van Dantzig's lower bound (in blue). Since the protection requirement is based on the 95th percentile of the aggregate interference, focus is on this portion of the tail of the CDFs. Slimane's upper bound CDF is very tight to the Monte Carlo distributions, and it gives a deterministic 95$^{th}$ percentile aggregate interference of −140.06 dBm/10 MHz. On the other hand, among all the lower bound CDFs, Van Dantzig's CDF has the tightest bound and gives a deterministic 95$^{th}$ percentile aggregate interference of −138.07 dBm/10 MHz.

Besides the Pensacola DPA, we also evaluate these bounds at some coastal DPAs (e.g. East5 and East7). Van Dantzig lower bound CDF might not be very tight to the Monte Carlo distribution as shown in FIG. 15, but it is the tightest bound among the lower bounds.

Deterministic Move Lists

Since Slimane's upper bound and Van Dantzig's lower bound provide the tightest bounds among the others on the aggregate interference distribution, we use these bounds to compute two deterministic move lists. The first is a reference move list for use by the test harness that is based on the tightest upper bound of the aggregate CDF. The second is an operational move list for use by the SAS that is based on the tightest lower bound of the aggregate CDF.

The former move list would be slightly smaller than the exact solution (to minimize false positives in testing), and the latter move list would be slightly larger than the exact solution (to minimize true positives, i.e., where the SAS computes a move list that is too small.)

Deterministic Reference Move List

The deterministic reference move list is based on the upper bound of the aggregate interference distribution. In computing the largest value ne to obtain the largest keep list possible, the 95$^{th}$ percentile of the aggregate interference does not exceed the protection level. Instead of using Monte Carlo techniques to estimate the 95$^{th}$ percentile of the aggregate interference, we use the upper bound of the aggregate interference distribution as follows.

To meet the protection criteria, $F_I(t) \geq 0.95$ is required. Since $F_I(x) \leq \Pi_{i=1}^{N} F_{I_i}(x)$ in (11), we know that the 95$^{th}$ percentile of the aggregate interference, $F_I^{-1}(0.95)$ is lower bounded by $F_{I,UB}^{-1}(0.95)$, where $F_{I,UB}(x)=\Pi_{N=1}^{N} F_{I_i}(x)$ and $F_{I_i}(x)$ is the CDF of the interference contribution of the i$^{th}$ grant. As a result, the deterministic reference move list is obtained by calculating the 95$^{th}$ percentile in Line 5 of Algorithm 1 with $F_{I,UB}^{-1}(0.95, S_n, a)$:

$$n_c \leftarrow \text{largest } n \text{ s.t. } F_{I,UB}^{-1}(0.95, S_n, a) \leq t \quad (17)$$

Recall that Sn is a set of the first n grants sorted by their median interference contribution to the protection point from smallest to largest, a is the azimuth direction of the receive antenna, and t is the protection threshold.

Deterministic Operational Move List

The deterministic operational move list is based on the lower bound of the aggregate distribution. After some manipulations with the Van Dantzig's inequality (16), the corresponding CDF of the lower bound distribution can be obtained as:

$$F_I(x) \geq \frac{8(x-\mu_I)^2}{3\sigma_I^2 + 8(x-\mu_I)^2} \quad (18)$$

By setting $$\frac{8(x-\mu_I)^2}{3\sigma_I^2 + 8(x-\mu_I)^2} = 0.95 \quad (19)$$

$F_I(x) \geq 0.95$, and the protection criteria is met. From (19), and assuming $x \geq \mu_I$, the 95$^{th}$ percentile aggregate interference associated with the lower bound CDF can be computed as $$x = \sqrt{\frac{57}{8} \sigma_I^2} + \mu_I$$

where 57/8 is a simplified ratio of $$\frac{3p}{8(1-p)}$$

with p=0.95.

Finally, the deterministic operational move list can be developed by replacing Line 5 in Algorithm 1 with the following:

$$\mu_I, \sigma_I^2 \leftarrow AggMeanVar\{S_n, a\} \quad (21)$$

$$n_c \leftarrow \text{largest } n \text{ s.t.} \left( \sqrt{\frac{57}{8} \sigma_I^2} + \mu_I \right) \leq t$$

Note that in (21), the aggregate mean $\mu_I$ and variance $\sigma_I^2$, are computed as $\mu_I = \Sigma_{i=1}^{n} \mu_{I_i}$ and $\sigma_I^2 = \Sigma_{i=1}^{n} \sigma_{I_i}^2$, where $\mu_{I_i}$ and $\sigma_{I_i}^2$ are the mean and variance of the interference contribution of the i$^{th}$ grant in the sorted list, $S_n$, at the receive antenna azimuth, a.

Single Protection Point DPA

We computed the proposed move lists on simulated deployments of CBSDs around a protection point near Pensacola, Fla. As mentioned earlier, the Pensacola DPA is a single point, inland DPA, and it has a protection threshold of −139 dBm/10 MHz. Out of 14409 CBSDs deployed in the vicinity of the DPA, there are only 5161 CBSDs in the neighborhood of the protection point.

Move List and Keep List

The primary output is a deterministic DPA move list, which is a list of grants that must be suspended and moved to another channel to protect the incumbent within the DPA from potential interference. The keep list, on the other hand, is just the complement of the move list, or the grants that may remain active on the protected channel.

Figure 16:
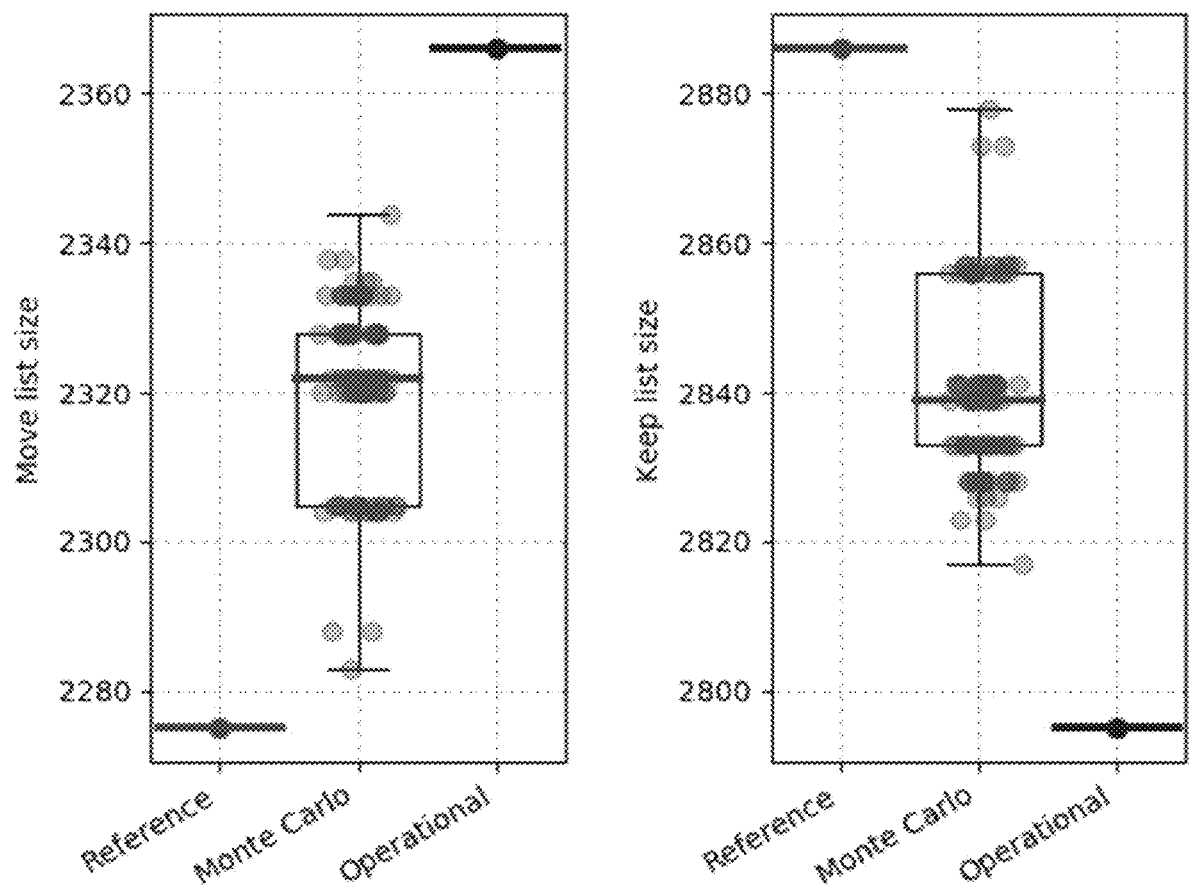
FIG. 16 shows move list and keep list sizes, Pensacola DPA.

FIG. 16 shows sizes of the deterministic move lists and keep lists computed using the proposed formulae as well as those of the Monte Carlo approach. The left subplot shows the move list sizes, whereas the right subplot shows the keep list sizes. The deterministic reference move list, computed utilizing the upper bound of the aggregate interference distribution, contains 2275 grants, and, thus, the keep list has the remaining 2886 grants (indicated in red). On the other hand, the deterministic operational move list, employing the lower bound CDF, has a slightly larger size of 2366 and, therefore, a smaller keep list size of 2795 (in blue). The box plots with jitters (in green) show the results of 100 trials of the Monte Carlo approach. As shown in the figure, the proposed deterministic move lists bound the uncertainty of the Monte Carlo outcomes. For the Pensacola DPA, since we could obtain tight upper and lower bounds of the aggregate interference distribution (as shown in FIG. 15), the bounds on the move list and keep list sizes are tight, as well.

The deterministic reference move list can be used by the test harness for testing the SAS. Since the reference move list is smaller than the exact solution, false positives in testing can be avoided. In contrast, the deterministic operational move list can be used by the SAS under test and in commercial operations. Because the operational move list is larger than the exact solution, the $95^{th}$ percentile of the aggregate interference of the keep list is smaller than the protection threshold. Therefore, its use would satisfy the test requirement and provide an additional margin of protection of federal incumbents.

Figure 17:
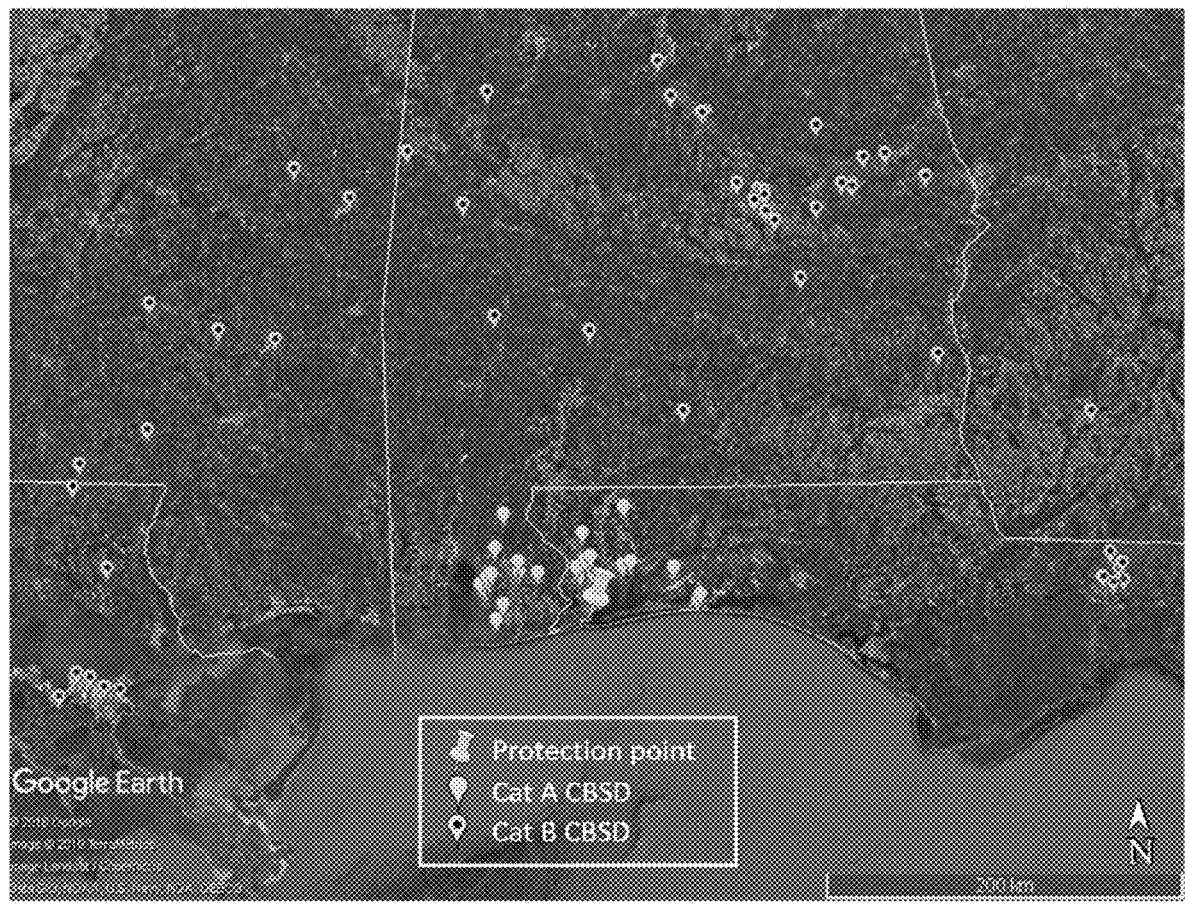
FIG. 17 shows a difference between operational and reference move lists, Pensacola DPA.

A geographic view of the difference between the deterministic operational and reference move lists is shown in FIG. 17. Markers without dots are Category A CBSDs, and markers with dots are Category B CBSDs. There are 91 grants in total, accounting for only 1.76% of the total grants in the neighborhood. These are the grants that have indices between 2796 and 2886 in the sorted list. All Category A CBSDs are within 70 km of the protection point, whereas the Category B CBSDs can be anywhere extending from 115 km to the neighborhood distance of 304 km from the protection point.

Aggregate Interference Check

To examine the performance of the proposed bounds in terms of interference protection, we calculated the $95^{th}$ percentile of the aggregate interference of each keep list at the protection point for every possible receiver antenna azimuth. FIG. 18 depicts the aggregate interference results. For each keep list, we applied the inequalities used for computing the upper bound CDF (i.e., Slimane's inequality) and lower bound CDF (i.e., Van Dantzig's inequality) to obtain the minimum and maximum of the aggregate interference, respectively.

FIG. 18(a) shows the aggregate interference results of the keep list using the upper bound CDF. All the values are below the protection threshold of −139 dBm/10 MHz for all azimuths. The strongest interference level received near the azimuth of 261° is −139.10 dBm/10 MHz for the reference keep list and −141.30 dBm/10 MHz for the operational keep list. The reference keep list has the largest size, thus creating the greatest interference at all azimuths (red line). On the other hand, the operational keep list has the smallest size, thus generating the smallest aggregate interference (blue dashed line). As expected, the aggregate interference of the 100 Monte Carlo keep lists (in green) are bounded by the aggregate interference of the deterministic keep lists.

FIG. 18(b) shows the aggregate results using the lower bound CDF. Because the lower bound CDF upper-bounds the $95^{th}$ percentile, the aggregate interference values in this plot are higher than those in FIG. 18(a) at every receiver azimuth. Some of the values for the reference and Monte Carlo keep lists exceed the threshold near the azimuth of 261°. This is expected because the interference percentile is overestimated by the lower bound of the CDF.

The results in FIG. 18 help to evaluate the tightness between the upper and lower bound CDFs. However, for the interference protection check, we separately can apply the upper bound CDF to the reference keep list and the lower bound CDF to the operational keep list. The protection requirement is met if the $95^{th}$ percentile of the aggregate interference in each case does not exceed the threshold of −139 dBm/10 MHz for all azimuths.

Results for Offshore DPAs

For results for the 40 coastal DPAs surrounding the CONUS, 26 DPAs stretch along the East and Gulf coasts (East1 to East26) and 14 DPAs along the West coast (West1 to West14). Unlike the Pensacola DPA having a protection threshold of −139 dBm/10 MHz, these coastal DPAs must be protected at a lower threshold of −144 dBm/10 MHz. Also, unlike the Pensacola DPA which consists of only a single protection point, these DPAs are all protection areas sampled with multiple protection points. In this analysis, we used the "default(25, 10, 10, 5)" protection points builder to generate a total of 50 protection points for each protection area.

FIG. 19(a), FIG. 20(a), and FIG. 21(a) show the reference move list and keep list sizes (in red and light red) and the operational move list and keep list sizes (in blue and light blue). The number of grants within the vicinity of a given DPA varies from thousands to tens of thousands, depending on the population data and geographical area surrounding the DPA. And because of the differences in terrain, some DPAs have most of their neighbor grants put on the move lists (e.g., DPAs East16 and East17 near southern Florida), whereas other DPAs have only a few grants on their move lists (e.g., DPAs West1 to West8 off the coasts of Washington, Oregon, and northern California). Regardless, as expected, the reference move list is always smaller than the operational move list for all DPAs. The ratio between the difference in the two move lists and the neighbor list size can be as small as 0.24% for DPA West3 and as large as 14.18% for DPA East5.

FIG. 19(b), FIG. 20(b), and FIG. 21(b) shows the maximum aggregate interference $95^{th}$ percentile of the keep list over all protection points and all receiver azimuths. Light red lines and light blue lines show the aggregate ranges of the reference keep lists and operational keep lists, respectively. Red squares represent the deterministic aggregate interference $95^{th}$ percentiles computed using the upper bound CDF, and blue triangles represent the deterministic aggregate interference $95^{th}$ percentiles computed using the lower bound CDF. We observe that the difference between the two limits varies from 2 dB (e.g., for the operational keep list in DPA West11) to 8 dB (e.g., for the reference keep list in DPA East5). Large differences reveal that the bounds are not tight at some protection points within the DPA or the limits do not occur at the same protection point and azimuth. Green dots show the random aggregate interference $95^{th}$ percentiles computed using the conventional Monte Carlo method. We notice that the green dots stay between the two limits. But in some cases (e.g., DPAs East17 and West7), the green dots are very close to the red squares, indicating the upper bound CDF is too tight to the aggregate interference distribution and might be sensitive to the accuracy of the individual interference contribution CDFs.

The maximum aggregate interference $95^{th}$ percentile (blue triangle) of the operational keep list (blue line) is always below the −144 dBm/10 MHz protection threshold for all coastal DPAs. Therefore, if all SASs apply the same operational move list, and if the lower bound CDF is used to conservatively check the $95^{th}$ percentile of the aggregate interference of the remaining keep list, we can ensure that the incumbent protection criteria are met without the need for heuristically obtained margins or the use of Monte Carlo reference move lists. In effect, the margin is built into the statistical bound used to calculate the operational move list.

Federal incumbent protection requirements in the 3.5 GHz CBRS band include the calculation of a percentile of the aggregate interference, which has a probability distribution with no known closed form. As a result, the conventional reference implementation of the federal incumbent protection (move list) algorithm resorts to the Monte Carlo method for calculating the $95^{th}$ percentile of the aggregate interference. The Monte Carlo method computes the path loss from each CBSD to a protection point in the protected area using a stochastic model. This causes uncertainty in the $95^{th}$ percentile of the aggregate interference, and thus, in the calculation of move list (the list of CBRS transmissions that must be moved off a channel requiring interference protection).

The inherent uncertainty in the conventional move list algorithm (which uses the Monte Carlo method) requires that uncertainty margins be used when testing spectrum access systems for compliance with federal incumbent protection requirements. In practice, these margins are calculated based on assumed deployments of CBRS devices. An inadequate choice of margin can either lead to underreported test failures (missed detections) or overreported failures (false alarms).

Using bounds on the distribution function of the aggregate interference, independently managing wireless transmission provides a deterministic alternative to Monte Carlo estimates of the $95^{th}$ percentile of the aggregate interference. Two deterministic move lists, a reference move list appropriate for testing SAS compliance and an operational move list for real-time incumbent protection, were presented in this Example. These move lists inherently build in the margins needed to avoid false alarms in testing and to conservatively protect incumbents in operation. These move lists for all 40 DPAs along the coasts of the continental U.S. and for one inland point DPA were included.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware, or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Any illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The process descriptions, elements or blocks in flow diagrams described herein or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The conjunction or is used to link objects of a list or alternatives and is not disjunctive; rather the elements can be used separately or can be combined together under appropriate circumstances. Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The modifier about used in connection with a quantity is inclusive of the stated value and has the meaning dictated by the context (e.g., it includes the degree of error associated with measurement of the particular quantity).

What is claimed is:

1. A method implemented by a system of one or more processors, the system being included in a spectrum access system and for independently managing wireless transmission by individual spectrum access systems in a radio frequency spectrum shared by a plurality of spectrum access systems, the method comprising:
   determining, by the spectrum access system, an interference budget $t_j$;
   determining, by the spectrum access system, secondary users managed by the spectrum access system in the radio frequency spectrum shared by the plurality of spectrum access systems comprising the spectrum access system and other spectrum access systems;
   managing, by the spectrum access system, a move list for the spectrum access system independently of the other spectrum access systems in an absence of exchange of spectrum grant information with the other spectrum access systems; and
   determining, by the spectrum access system, the move list for the spectrum access system from a first moment and a second moment of an aggregate interference distribution such that the spectrum access system provides grants to its secondary users in the neighborhood of a dynamic protection area of the spectrum access system according to $$\sigma_j \sqrt{\frac{3p}{8(1-p)}}, +\mu_j \leq t_j,$$

wherein $\mu_j$ is a mean of a received power of secondary users managed by the spectrum access system in the dynamic protection area, $\sigma_j$ is a square root of a variance of the received power, and p is a protection percentile for an incumbent in the dynamic protection area.

2. The method of claim 1, further comprising suspending, by the spectrum access system, secondary users on the move list for the spectrum access system.

3. The method of claim 1, further comprising protecting the incumbent in the shared radio frequency spectrum in the dynamic protection area from aggregate interference exceeding a protection threshold from secondary users managed by the plurality of spectrum access systems.

4. The method of claim 3, wherein a total protection percentile is greater than or equal to 0.95.

5. The method of claim 1, wherein p is equal to 0.95.

6. The method of claim 1, wherein radio frequency spectrum shared by the plurality of spectrum access systems comprises a 3.5 GHz Citizens Broadband Radio Service in the United States.

7. A system, for independently managing wireless transmission by an individual spectrum access system in a radio frequency spectrum shared by a plurality of spectrum access systems, comprising:
   a processor that determines an interference budget $t_j$;
   a management module, stored in memory and coupled to the processor, that:
   receives the interference budget $t_j$ from the processor;
   manages a move list for the spectrum access system independently of other spectrum access systems in an absence of exchange of spectrum grant information with the other spectrum access systems; and determines the move list for the spectrum access system from a first moment and a second moment of an aggregate interference distribution such that the spectrum access system provides grants to its secondary users in the neighborhood of a dynamic protection area of the spectrum access system accordion to $$\sigma_j \sqrt{\frac{3p}{8(1-p)}} + \mu_j \le t_j,$$

wherein $\mu_j$ is a mean of a received power of secondary users managed by the spectrum access system in the dynamic protection area, $\sigma_j$ is a square root of a variance of the received power, and p is a protection percentile for an incumbent in the dynamic protection area; and a determination engine, stored in memory and coupled to the processor, that:
  determines secondary users managed by the spectrum access system in the radio frequency spectrum shared by the plurality of spectrum access systems comprising the spectrum access system and the other spectrum access systems; and
  suspends secondary users on the move list for the spectrum access system from emitting radio frequency signals in the radio frequency spectrum shared by the plurality of spectrum access systems.

8. The system of claim 7, further comprising protecting the incumbent in the shared radio frequency spectrum in the dynamic protection area from aggregate interference exceeding a protection threshold from secondary users managed by the plurality of spectrum access systems.

9. The system of claim 8, wherein a total protection percentile is greater than or equal to 0.95.

10. The system of claim 7, wherein p is equal to 0.95.

11. The system of claim 7, wherein radio frequency spectrum shared by a plurality of spectrum access systems comprises a 3.5 GHz Citizens Broadband Radio Service in the United States.

12. Non-transitory computer storage media storing instructions for execution by a system of one or more processors, the system being included in a spectrum access system, and the instructions causing the one or more processors to perform operations comprising: determining, by the spectrum access system, an interference budget $t_j$; determining, by the spectrum access system, secondary users managed by the spectrum access system in a radio frequency spectrum shared by a plurality of spectrum access systems comprising the spectrum access system and other spectrum access systems; managing, by the spectrum access system, a move list for the spectrum access system independently of the other spectrum access systems in an absence of exchange of spectrum grant information with the other spectrum access systems; and determining, by the spectrum access system, the move list for the spectrum access system from a first moment and a second moment of an aggregate interference distribution such that the spectrum access system provides grants to its secondary users in the neighborhood of a dynamic protection area of the spectrum access system according to $$\sigma_j \sqrt{\frac{3p}{8(1-p)}} + \mu_j \le t_j,$$

wherein $\mu_j$ is a mean of a received power of secondary users managed by the spectrum access system in the dynamic protection area, $\sigma_j$ is a square root of a variance of the received power, and p is a protection percentile for an incumbent in the dynamic protection area.

13. The non-transitory computer storage media of claim 12, the operations further comprising suspending, by the spectrum access system, secondary users on the move list for the spectrum access system.

14. The non-transitory computer storage media of claim 12, the operations further comprising protecting the incumbent in the shared radio frequency spectrum in the dynamic protection area from aggregate interference exceeding a total protection threshold from secondary users managed by the plurality of spectrum access systems.

15. The non-transitory computer storage media of claim 14, wherein a total protection percentile is greater than or equal to 0.95.

16. The non-transitory computer storage media of claim 12, wherein p is equal to 0.95.

17. The non-transitory computer storage media of claim 12, wherein radio frequency spectrum shared by a plurality of spectrum access systems comprises a 3.5 GHz Citizens Broadband Radio Service in the United States.

* * * * *